United States Patent
Hong et al.

(10) Patent No.: US 10,460,096 B2
(45) Date of Patent: Oct. 29, 2019

(54) MOTION-BASED IDENTITY AUTHENTICATION OF AN INDIVIDUAL

(71) Applicant: Ohio University, Athens, OH (US)

(72) Inventors: Siang Lee Hong, Canal Winchester, OH (US); Chang Liu, Athens, OH (US)

(73) Assignee: Ohio University, Athens, OH (US)

( * ) Notice: Subject to any disclaimer, the term of this patent is extended or adjusted under 35 U.S.C. 154(b) by 49 days.

(21) Appl. No.: 15/033,264

(22) PCT Filed: Oct. 30, 2014

(86) PCT No.: PCT/US2014/063069
§ 371 (c)(1),
(2) Date: Apr. 29, 2016

(87) PCT Pub. No.: WO2015/066274
PCT Pub. Date: May 7, 2015

(65) Prior Publication Data
US 2016/0253490 A1    Sep. 1, 2016

Related U.S. Application Data

(60) Provisional application No. 61/897,511, filed on Oct. 30, 2013.

(51) Int. Cl.
*G06F 21/36* (2013.01)
*G06F 21/31* (2013.01)
(Continued)

(52) U.S. Cl.
CPC .......... *G06F 21/36* (2013.01); *G06F 21/316* (2013.01); *G06F 21/32* (2013.01); *H04L 63/083* (2013.01)

(58) Field of Classification Search
CPC . H04L 63/08; H04L 63/0807; H04L 63/0823; H04L 9/321; H04L 9/3247; H04L 9/327
See application file for complete search history.

(56) References Cited

U.S. PATENT DOCUMENTS

| 4,128,829 A | 12/1978 | Herbst et al. |
| 4,553,258 A | 11/1985 | Chainer et al. |

(Continued)

FOREIGN PATENT DOCUMENTS

| EP | 1353263 A1 | 10/2003 |
| EP | 2341465 A2 | 7/2011 |

(Continued)

OTHER PUBLICATIONS

International Searching Authority, European Patent Office, International Search Report and Written Opinion issued in corresponding PCT Application No. PCT/US2014/063069, dated Apr. 8, 2015 (14 pages).

(Continued)

*Primary Examiner* — Saleh Najjar
*Assistant Examiner* — Devin E Almeida
(74) *Attorney, Agent, or Firm* — Wood Herron & Evans LLP

(57) ABSTRACT

Systems (110) and methods (200) securely authenticate an identity of an individual based on a pattern (350) that is traced by the individual. Embodiments of the present disclosure relate to prompting (210) an individual with a pattern (350) to trace when attempting to authenticate the identity of the individual during an identity authentication session. Motion-based behavior data that is generated by motions executed by the individual as the individual traces the pattern (350) is captured (230) via a motion-capturing sensor (130). The motion-based behavior data is unique to the individual and has a low likelihood of being duplicated by an unauthorized individual attempting to fraudulently pose as the individual. The captured motion-based behavior data is compared (250) to previously captured motion-based behavior data from previous traces (360) of the pattern (350) completed by the individual. The identity of the individual (Continued)

is authenticated (260) when the motion-based behavior data is within a threshold of the previously captured motion-based behavior data.

25 Claims, 13 Drawing Sheets

(51) Int. Cl.
*G06F 21/32* (2013.01)
*H04L 29/06* (2006.01)

(56) References Cited

U.S. PATENT DOCUMENTS

| | | | |
|---|---|---|---|
| 4,553,259 A | 11/1985 | Chainer et al. | |
| 4,789,934 A | 12/1988 | Gundersen et al. | |
| 5,987,153 A | 11/1999 | Chan et al. | |
| 8,036,433 B1 | 10/2011 | Wolff | |
| 9,207,772 B2 | 12/2015 | Liu et al. | |
| 9,300,645 B1* | 3/2016 | Rao | H04L 63/08 |
| 9,626,498 B2* | 4/2017 | Gay | G06F 21/36 |
| 9,921,741 B2 | 3/2018 | Liu et al. | |
| 9,984,218 B2 | 5/2018 | Liu et al. | |
| 2003/0103653 A1* | 6/2003 | Avni | G06F 21/32 382/119 |
| 2008/0021997 A1* | 1/2008 | Hinton | H04L 63/0815 709/225 |
| 2008/0113791 A1* | 5/2008 | Williams | G06F 21/36 463/29 |
| 2010/0052851 A1* | 3/2010 | Kaehler | G06F 3/017 340/5.81 |
| 2010/0225443 A1* | 9/2010 | Bayram | G06F 21/316 340/5.83 |
| 2012/0016798 A1 | 1/2012 | Carper | |
| 2013/0004016 A1* | 1/2013 | Karakotsios | G06K 9/00355 382/103 |
| 2013/0014248 A1 | 1/2013 | McLaughlin et al. | |
| 2013/0076645 A1* | 3/2013 | Anantha | G06F 3/0488 345/173 |
| 2013/0086674 A1* | 4/2013 | Horvitz | G06F 21/32 726/19 |
| 2013/0259330 A1 | 10/2013 | Russo et al. | |
| 2013/0269013 A1* | 10/2013 | Parry | H04L 63/0861 726/7 |
| 2013/0347087 A1* | 12/2013 | Smith | G06F 21/36 726/7 |
| 2014/0007225 A1* | 1/2014 | Gay | G06F 21/36 726/19 |
| 2014/0020091 A1* | 1/2014 | Pasquero | G06F 3/013 726/19 |
| 2014/0071041 A1* | 3/2014 | Fujimaki | G02B 27/0172 345/156 |
| 2014/0123258 A1* | 5/2014 | Guerrero | G06F 3/0488 726/7 |
| 2014/0281946 A1* | 9/2014 | Avni | G06T 1/0021 715/268 |

FOREIGN PATENT DOCUMENTS

| | | |
|---|---|---|
| JP | 2010114725 A | 5/2010 |
| JP | 2011034497 A | 2/2011 |
| WO | 2010005662 A1 | 1/2010 |

OTHER PUBLICATIONS

European Patent Office, Extended European Search Report issued in EP Application No. 14797514.8, dated Jan. 12, 2017 (7 pages).
German, Kent, "Unlock Pattern of Android Phone", YouTube Video Nov. 6, 2009 [retrieved by ISA/US on Aug. 7, 2014] Retrieved from internet: <https://www.youtube.com/watch?v=3tnnsxcienQ> (2 pages).
International Search Report and Written Opinion from International Application No. PCT/US2014/015995, dated May 16, 2014 (9 pages).
International Search Report and Written Opinion from International Application No. PCT/US2014/037670, dated Jan. 9, 2015 (12 pages).
International Communication in Application PCT/US2014/037670 from the ISA/US dated Sep. 5, 2014 (3 pages).
Japan Patent Office, Office Action dated Aug. 14, 2017, issued in JP Application No. 2016-514006 corresponding to U.S. Pat. No. 9,921,741.
Unlock Pattern of Android Phone.—YouTube, <https://www.youtube.com/watch?v=3tnnsxcienQ> dated Aug. 27, 2014 (2 pages).

* cited by examiner

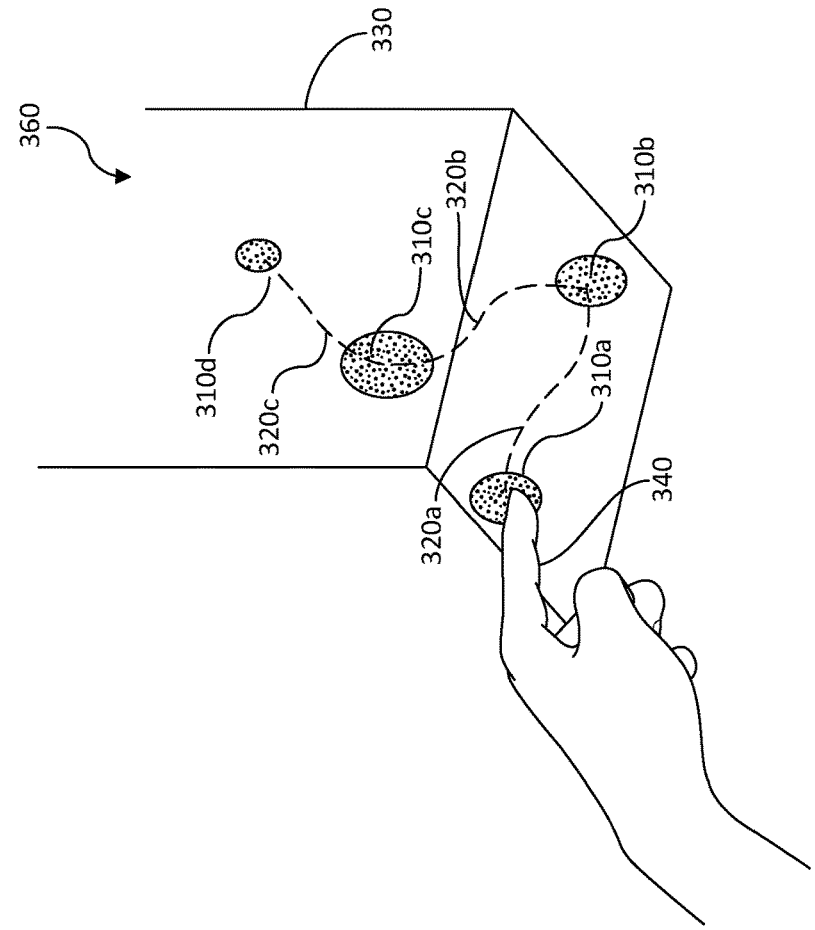
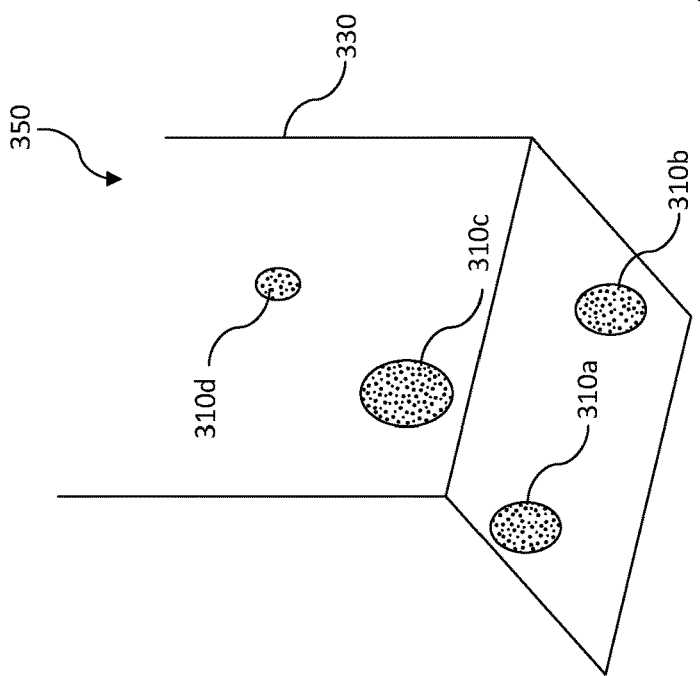
FIG. 3B
FIG. 3A

Input Data Martix 610

| | X-Position | Y-Position | Velocity |
|---|---|---|---|
| Initial Point | 1 | 1 | 5 |
| Second Point | 2 | 5 | 4 |
| Third Point | 3 | 4 | 3 |
| Fourth Point | 4 | 3 | 2 |
| End Point | 2 | 2 | 1 |

FIG. 6A

Input Data Covariance Martix (derived from Input Data Matix) 620

| | X-Position | Y-Position | Velocity |
|---|---|---|---|
| X-Position | 2.5 | 0 | -2.5 |
| Y-Position | 0 | 4.8 | 0 |
| Velocity | -2.5 | 0 | 2.5 |

FIG. 6B

| Input Data Eigenvector Matrix (derived from Input Data Covariant Matrix) | | |
|---|---|---|
| 0.707107 | 0 | 0.707107 |
| 0 | 1 | 0 |
| -0.70711 | 0 | 0.707107 |

FIG. 6C

| Rotated Input Data Eigenvector Matrix (derived from Input Data Matrix and Input Data Eigenvector Matrix) | | |
|---|---|---|
| 4.16 | -2.48 | 5.53 |
| 1.6 | 0.76 | 5.64 |
| 4.35 | -2.29 | 4.56 |
| 0.62 | -0.59 | 4.16 |
| 6.89 | 0.95 | 4.65 |

FIG. 6D

Reference Data Matrix 650

| | X-Position | Y-Position | Velocity |
|---|---|---|---|
| Initial Point | 1 | 1 | 5 |
| Second Point | 2 | 5 | 5 |
| Third Point | 4 | 4 | 4 |
| Fourth Point | 3 | 3 | 3 |
| End Point | 2 | 3 | 2 |

FIG. 6E

Reference Data Covariance Matrix (derived from Reference Data Matrix) 660

| | X-Position | Y-Position | Velocity |
|---|---|---|---|
| X-Position | 0.59 | 0.76 | 0.26 |
| Y-Position | 0.79 | -0.62 | 0.04 |
| Velocity | -0.19 | -0.18 | 0.96 |

FIG. 6F

| Reference Data Eigenvector Matrix (derived from Reference Data Covariant Matrix) | | |
|---|---|---|
| 0.589 | 0.756 | 0.262 |
| 0.786 | -0.617 | 0.037 |
| -0.189 | -0.184 | 0.965 |

| Transpose Reference Data Eigenvector Matrix | | |
|---|---|---|
| 0.589 | 0.786 | -0.189 |
| 0.765 | -0.617 | -0.184 |
| 0.262 | 0.037 | 0.964 |

| Re-Keyed Input Data Matrix | | | |
|---|---|---|---|
| | X-Position | Y-Position | Velocity |
| Initial Point | 1.85 | -1.48 | 5.97 |
| Second Point | 2.95 | 4.76 | 5.86 |
| Third Point | 2.45 | 3.29 | 4.15 |
| Fourth Point | 5.38 | 2.59 | 2.50 |
| End Point | 2.16 | 1.95 | -1.59 |

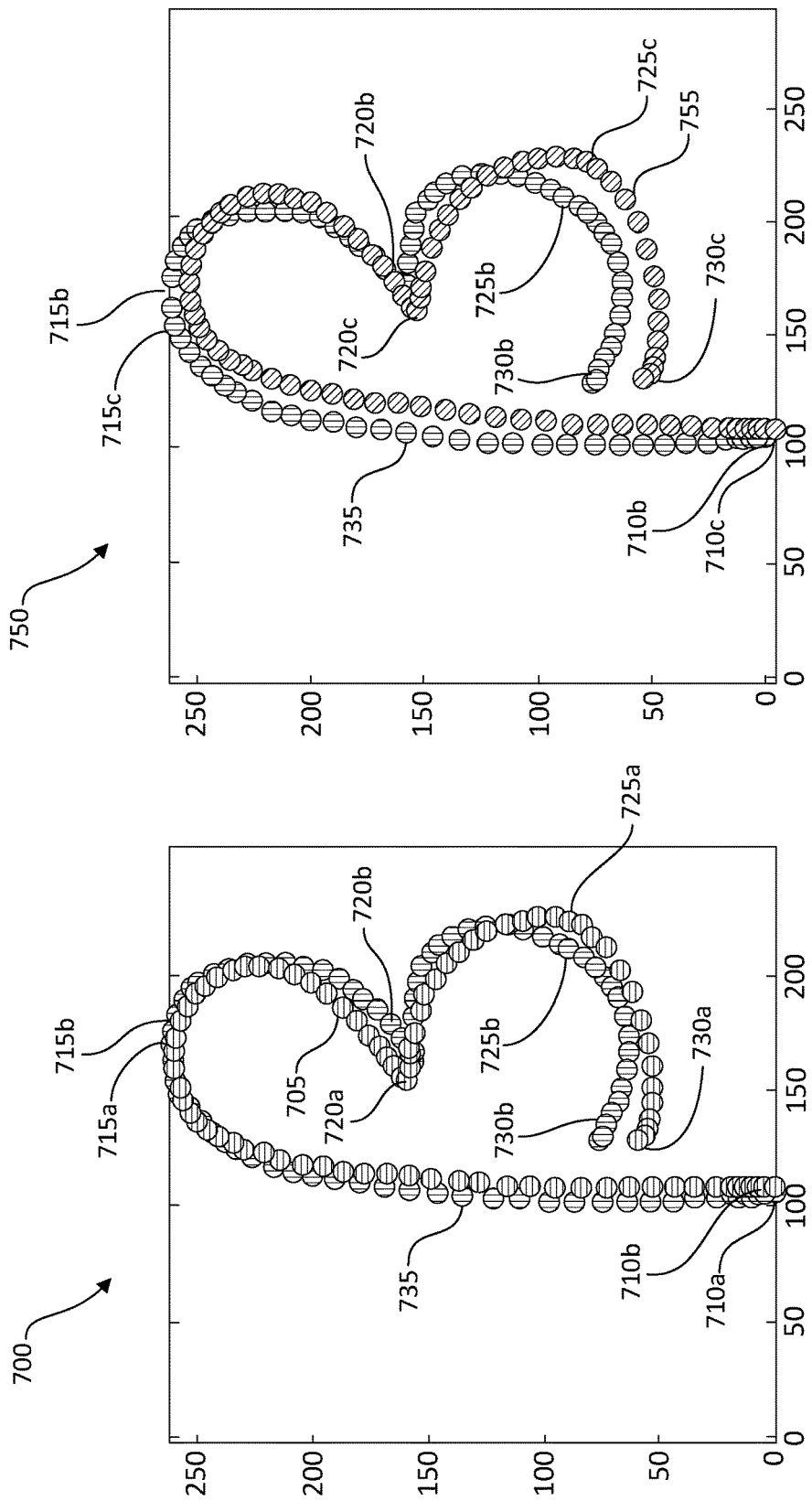

MOTION-BASED IDENTITY AUTHENTICATION OF AN INDIVIDUAL

CROSS-REFERENCE TO RELATED APPLICATIONS

This application claims the benefit of U.S. Application No. 61/897,511 filed on Oct. 30, 2013, which is incorporated herein by reference in its entirety.

BACKGROUND

A tradeoff exists between providing secure authentication of an individual's identity while not over-burdening the individual with daunting authentication requirements. Identity authentication should be secure so that the individual is not susceptible to identity theft during identity authentication. The identity authentication should also be convenient for the individual so that the individual can easily participate in identity authentication and engage in the activities protected by the authentication.

Conventional identity authentication techniques include conventional authentication of a personal identification number (PIN) and/or a password provided by the individual seeking authentication. Conventional authentication of a PIN and/or a password includes an inherent tradeoff between security and convenience for the individual. There is a significant threat of identity theft from hackers attempting to steal the individual's PIN and/or password to gain access to the individual's activities associated with the entity. For example, hackers may attempt to steal an individual's password to the individual's online banking account provided by the individual's bank. In order to increase the difficulty of the hacker from gaining access to an individual's PIN and/or password, the individual should generate a complicated PIN and/or password that differs for each entity that the individual is engaged with that requires identity authentication. The complicated PIN and/or password should also be unrelated to personal aspects of the individual, such as the individual's birth date.

However, having a complicated PIN and/or password that differs for each entity and is unrelated to the personal aspects of the individual increases the difficulty of the individual to easily recall the appropriate PIN and/or password for each entity. This increased difficulty adds an inconvenience to the individual because the individual may not be able to recall the appropriate PIN and/or password when attempting to engage the entity. For example, the individual may not recall their PIN when attempting to access money from an automatic teller machine (ATM). Without the proper PIN, the individual cannot obtain the requested funds from the ATM and would have to take additional measures to determine the proper PIN.

In order to increase the ease of the individual to remember the appropriate PIN and/or password for each entity, the individual may select the same PIN and/or password for each entity that the individual is engaged with and/or also associate the PIN and/or password to a personal aspect of the individual. For example, the individual may select the individual's birth date as the PIN and/or password for every entity the individual is engaged. Although this increases the convenience of the individual to easily recall the appropriate PIN and/or password, this increases the susceptibility of the individual to identity theft. A hacker simply needs to obtain the PIN and/or password for the individual for a single entity and then can have access to every other entity the individual is engaged with that uses the stolen PIN and/or password for identity authentication.

Conventional identity authentication techniques also include conventional hardware and/or software tokens required by an entity to authenticate the individual's identity. Conventional hardware and/or software tokens also include an inherent tradeoff between security and convenience for the individual. Conventional hardware and/or software tokens are more difficult to obtain via hacking into an entity's system to obtain the individual's PIN and/or password. Conventional hardware and/or software tokens are also more difficult to duplicate via computation than the individual's PIN and/or password. However, conventional hardware and/or software tokens can physically be stolen. Once stolen, the individual's activities associated with the entity that requires the conventional hardware and/or software token for identity authentication are compromised and can be accessed.

For example, once the conventional hardware token is physically stolen, the individual's bank accounts associated with the bank that requires the conventional hardware token to authenticate the individual's identity are now accessible to the possessor of the conventional hardware token. The individual also has the added inconvenience of not being able to access the bank accounts when the individual forgets to bring the conventional hardware token to the bank. The individual would have to take additional measures to obtain the conventional hardware token before being able to access the bank accounts.

Conventional identity authentication techniques also include conventional biometric imprints. A conventional biometric imprint is a digital scan of a physical aspect of the individual. For example, a conventional biometric imprint includes a digital scan of an individual's fingerprint. The conventional biometric imprint is unique to the individual in that no other individual can have a substantially identical biometric imprint. Each individual has fingerprints unique to themselves. The conventional biometric imprint is also convenient for the individual because the individual always has their fingers available to be digitally scanned when engaged in an identity authentication session. However, the individual also leaves their fingerprints on physical objects that can easily be digitally scanned and replicated. Once an individual's fingerprint has been digitally scanned, replicated and essentially stolen, the individual's activities are now susceptible with every entity that presently require the individual's fingerprint and any entity in the future that requires the individual's fingerprint. Unlike a PIN and/or password, the individual cannot change their fingerprint.

For example, an individual's fingerprint is digitally scanned by a third party unknown to the individual from a touch screen at a gas pump after the individual operated the gas pump leaving their fingerprints at the gas pump. The individual's fingerprint has now been stolen and can be used to fraudulently access the individual's bank accounts associated with a bank that requires the digital scanning of the individual's fingerprint to authenticate the individual's identity. Digitally scanned fingerprints are also stored as electronic data, thereby exposing the individual's fingerprint data to hackers. The individual cannot change their fingerprint so now the individual's activities associated with the bank or any future entity that requires digital scanning of the individual's fingerprint for identity authentication are now accessible to others in possession of the digital scan of the individual's fingerprint.

BRIEF SUMMARY

Embodiments of the present invention relate to secure authentication of an individual's identity by authenticating motions, such as hand motions, executed by the individual. In an embodiment, a method provides for securely authenticating an identity of an individual based on a pattern that is traced by the individual. A traced pattern may be received from the individual that may be generated from tracing a defined pattern via a user interface. The motion-based behavior data may be compared with previously captured motion-based behavior data to thereby authenticate the identity of the individual.

In an embodiment, a system securely authenticates an individual based on a pattern that may be traced by the individual. A transceiver is configured to receive a traced pattern from the individual generated when the individual traces a defined pattern, with for example their finger, via a user interface. This information is stored as motion based behavior data. A comparing module is configured to compare the motion-based behavior data with previously captured motion-based behavior data to thereby authenticate the identity of the individual.

Further embodiments, features, and advantages, as well as the structure and operation of the various embodiments, are described in detail below with reference to the accompanying drawings.

BRIEF DESCRIPTION OF THE DRAWINGS/FIGURES

Embodiments are described with reference to the accompanying drawings. In the drawings, like reference numbers may indicate identical or functionally similar elements.

FIG. 3A depicts an example uncompleted authentication template for authenticating an individual's identity based on motions executed by the individual in three-dimensions;

FIG. 3B depicts an example completed authentication template for authenticating an individual's identity based on motions executed by the individual in three-dimensions;

Figure 8:
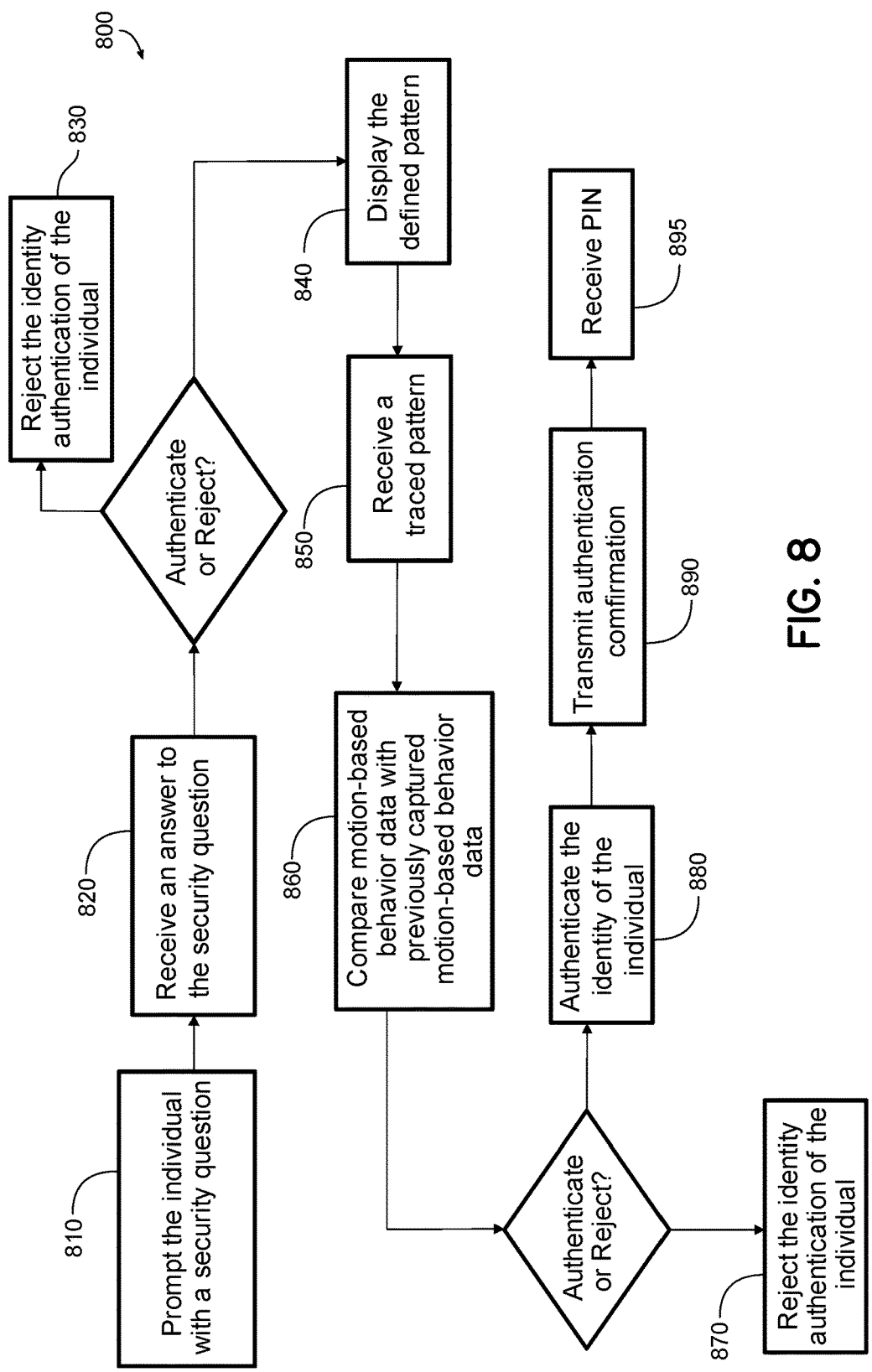
Figure 9:
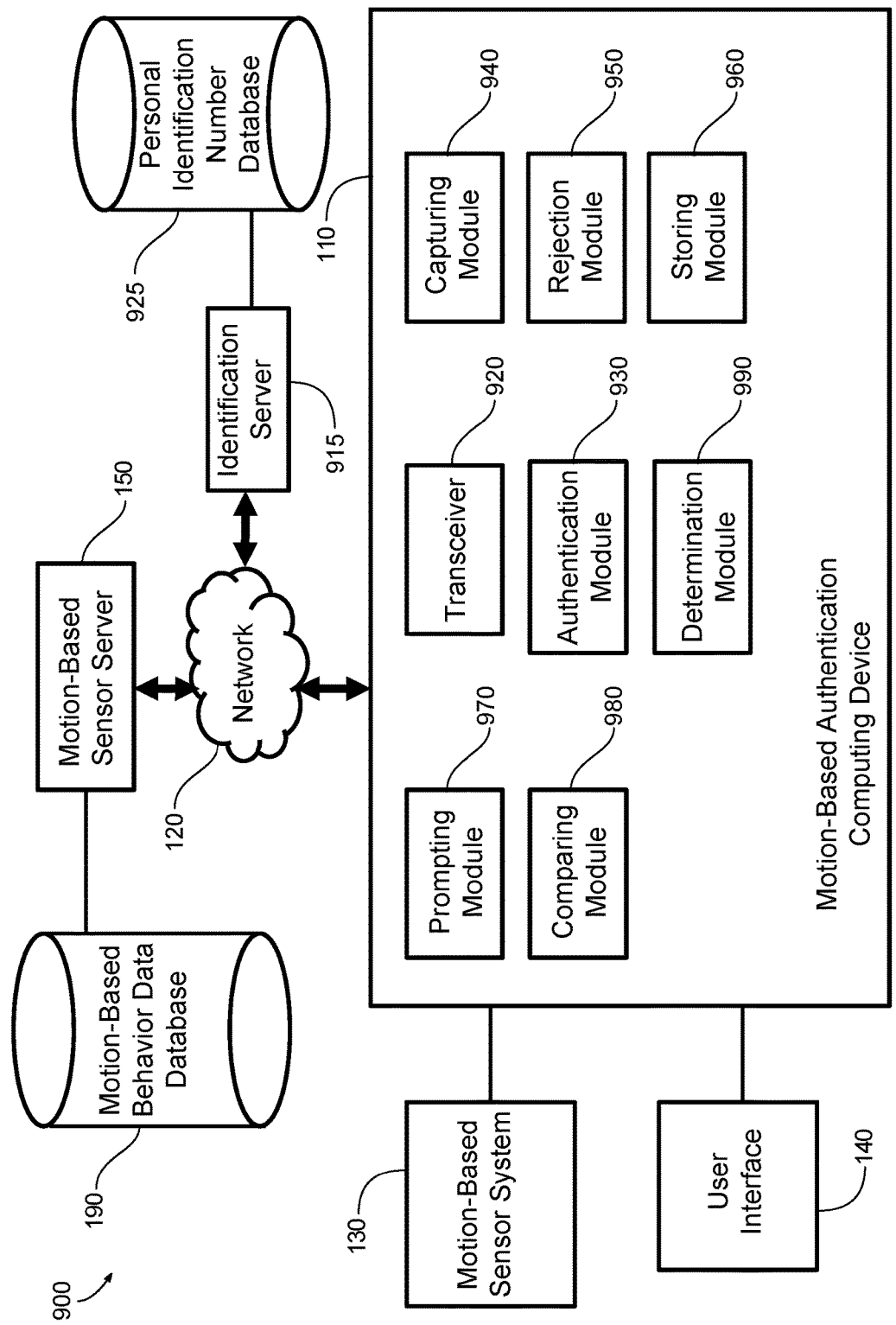

FIG. 6A provides an example input data matrix for the individual completing the trace of the pattern in a subsequent attempt to log-in and/or have their identity authenticated by the entity after completing the initial authentication template;

FIG. 6B provides an example input data covariance matrix that is the covariance matrix for the example input data matrix;

FIG. 6C provides an example input data eigenvector matrix that is the input data eigenvector matrix for the input data derived from the example input data covariance matrix;

FIG. 6D provides an example rotated input eigenvector matrix that includes the rotated input data from the example input data eigenvector matrix;

FIG. 6E provides an example reference data matrix for the individual completing the trace of the pattern in a previous attempt to establish an authentication template and/or a previous log-in attempt;

FIG. 6F provides an example reference data covariance matrix that is the covariance matrix for the example reference data matrix;

FIG. 6G provides an example reference data eigenvector matrix that is the reference data eigenvector matrix for the reference data derived from the example reference data covariance matrix;

FIG. 6H provides an example transpose reference data eigenvector matrix that is the transpose of the example reference data eigenvector matrix;

FIG. 6I provides an example re-keyed input data matrix that is generated by multiplying the example input data eigenvector matrix with the transpose reference data eigenvector matrix;

FIG. 7A depicts an example identity authentication of the individual based on an independent comparison of motion-based behavior data;

FIG. 7B depicts an example identity authentication of the individual based on an inter-relationship comparison of motion-based behavior data;

FIG. 8 is a flowchart showing an example method of multi-layer authentication based on the comparison of motion-based behavior data to previously captured motion-based behavior data; and FIG. 9 depicts a detailed view of an exemplary motion-based identity authentication system for authenticating an individual's identity based on motions executed by the individual.

DETAILED DESCRIPTION

In the Detailed Description herein, references to "one embodiment", "an embodiment", an "example embodiment", etc., indicate that the embodiment described may include a particular feature, structure, or characteristic, by every embodiment may not necessarily include the particular feature, structure, or characteristic. Moreover, such phrases are not necessarily referring to the same embodiment. Further, when a particular feature, structure, or characteristic may be described in connection with an embodiment, it may be submitted that it may be within the knowledge of one skilled in the art to affect such feature, structure, or characteristic in connection with other embodiments whether or not explicitly described.

The following detailed description refers to the accompanying drawings that illustrate exemplary embodiments. Other embodiments are possible, and modifications can be made to the embodiments within the spirit and scope of this description. Those skilled in the art with access to the teachings provided herein will recognize additional modifications, applications, and embodiments within the scope thereof and additional fields in which embodiments would be of significant utility. Therefore, the detailed description is not meant to limit the embodiments described below.

In an embodiment, the identity of an individual may be authenticated based on movements executed by an individual when tracing a pattern. The movements that the individual executes may be based on the musculoskeletal and neurological systems of the individual which are unique to the individual and are not naturally duplicated in any other individual. The uniqueness of the musculoskeletal and neurological systems of the individual may result in unique movements and decision making processes when tracing a pattern that cannot also be substantially duplicated by any other individual. The unique movements and decision making processes generated by the individual when tracking a pattern generate motion-based behavior data that can be captured from the individual's movements and used to authenticate the identity of the individual.

The motion-based behavior data may include data related to biometric characteristics of the individual which is associated with the unique musculoskeletal system of the individual and also behaviometric characteristics associated with the unique neurological system of the individual. The biometric characteristics are related to the physiological aspects of the individual that an individual cannot change.

The behaviometric characteristics are related to the behavior of the individual when the individual encounters a situation such as having to solve a puzzle or trace a pattern. The individual may perceive wholeness when presented a pattern and subconsciously attempts to complete the pattern. The individual's brain may quickly and subconsciously fill in gaps to connect the pattern. The path that the individual selects to complete the pattern may then be quickly translated to subconscious movement patterns performed by the individual that are mechanically efficient and the most comfortable for the individual to complete the trace of the pattern. Each time the individual traces the same pattern, some behaviometric characteristics associated with the individual's trace are similar but rarely substantially identical. However, the behaviometric characteristics that are rarely substantially identical when generated by the individual are unlikely to be substantially duplicated by another individual attempting to trace the same pattern as the individual.

Even if an entity has a security breach where the individual's stored biometric and behaviometric characteristics from previously traced patterns are stolen, the behaviometric characteristics would likely be a substantially identical match to the previously captured behaviometric characteristics from previously traced patterns. Some behaviometric characteristics, such as the actual path of the individual's index finger when tracing the pattern, has a low likelihood of being substantially identical with a previously captured path of the individual's index finger. Each path of the individual's index finger may be similar to each other but not substantially identical. A substantially identical path would indicate that the individual's stored biometric and behaviometric characteristics from previously traced patterns have been stolen and the identity would fail authentication.

The combination of the biometric and behaviometric characteristics used for identity authentication implements identification characteristics that are difficult to fraudulently obtain and/or replicate. Further, the added security layer of some behaviometric characteristics that indicate identity theft when substantially identical to previously captured behaviometric characteristics provide an additional security layer to combat instances where the previously captured biometric and behaviometric characteristics have been stolen. Identity authentication based on motions executed by the individual is also convenient for the individual. The individual no longer has to memorize passwords and/or remember to bring a token. The individual simply needs to trace a pattern.

Overview

Figure 1:
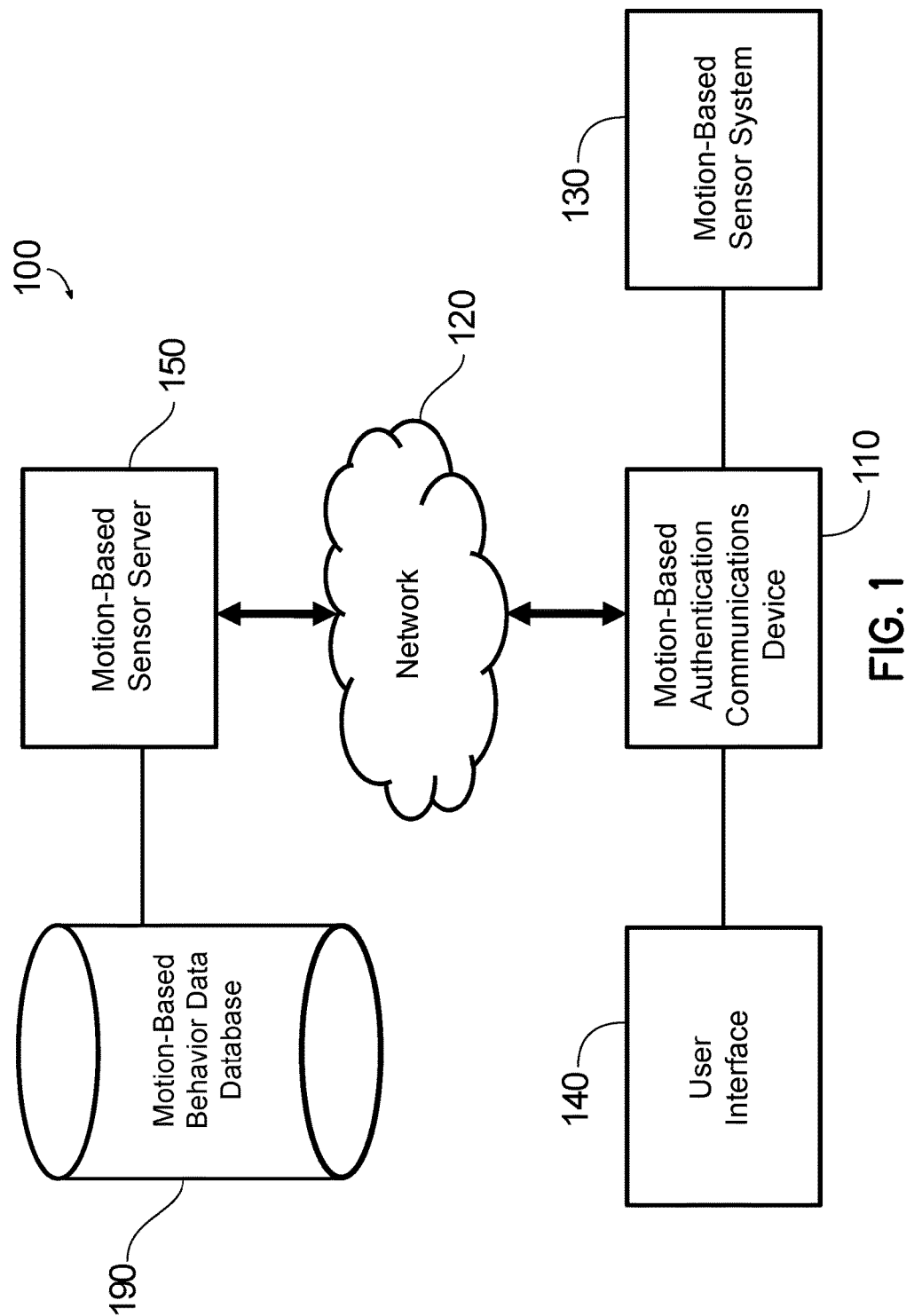
FIG. 1 shows an illustration of motion-based identity authentication configuration.

As shown in FIG. 1, motion-based identity authentication configuration 100 includes a motion-based authentication computing device 110, a network 120, a motion-based sensor system 130, a user interface 140, a motion-based sensor server 150, and a motion-based behavior data database 190.

Motion-based authentication computing device 110 may be a device that is capable of electronically communicating with other devices while having the capability to display a three-dimensional and/or two-dimensional pattern as well as receive motion-based behavior data generated from an individual who traces the three-dimensional and/or two dimensional patterns. For example, the display associated with motion-based authentication computing device 110 may be a natural user interface that is substantially invisible to the individual. In such an example, motion-based authentication computing device 110 generates a virtual three-dimensional pattern where the individual completes the trace of the three-dimensional pattern without touching a physical user interface associated with the motion-based authentication computing device 110, such as a multi-touch display.

Examples of motion-based authentication computing device 110 may include a mobile telephone, a smartphone, a workstation, a portable computing device, other computing devices such as a laptop, or a desktop computer, cluster of computers, set-top box, a computer peripheral such as a printer, a portable audio, and/or video player, a payment system, a ticketing writing system such as a parking ticketing system, a bus ticketing system, a train ticketing system or an entrance ticketing system to provide some examples, or in a ticket reading system, a toy, a game, a poster, packaging, an advertising material, a product inventory checking system and or any other suitable electronic device with a multi-touch display that will be apparent to those skilled in the relevant art(s) without departing from the spirit and scope of the invention.

In an embodiment, multiple modules may be implemented on the same computing device. Such a computing device may include software, firmware, hardware, or a combination thereof. Software may include one or more applications on an operating system. Hardware can include, but is not limited to, a processor, memory, and/or graphical user interface display. Motion-based authentication computing device 110 may store the motion-based behavior data captured by motion-based sensor system 130.

An individual engaged in an identity authentication session may interact with motion-based authentication computing device 110 via user interface 140. User interface 140 may include an interface that has the capability to display a three-dimensional and/or two-dimensional pattern as well as receive motion-based behavior data generated from an individual who traces the three-dimensional and/or two-dimensional patterns. User interface 140 may include any type of user interface that has the capability to display a three-dimensional and/or two-dimensional pattern as well as receive motion-based behavior data generated from the traces of the patterns including but not limited to a natural user interface, a touch screen display, a cathode ray tube (CRT) monitor, a liquid crystal display (LCD) screen, and/or any other type of display device that will be apparent from those skilled in the relevant art(s) without departing from the spirit and scope of the present disclosure.

One or more motion-based sensor systems 130 may connect to one or more motion-based authentication computing devices 110. Motion-based sensor system 130 may include one or more sensors that capture motion-based behavior data that is generated by the physical movement of an individual. Motion-based sensor system 130 may include a video imaging system, an infrared imaging system, a photographic imaging system, an air sensing system, a thermal sensing system, a motion sensor that is capable of capturing two-dimensional data such as a Kinect motion sensing input device by Microsoft, a volumetric sensor that is capable of capturing three-dimensional data such as a Leap Motion sensing input device by Leap Motion, and/or any other type of motion sensing system that includes sensors that will be apparent to those skilled in the relevant art(s) without departing from the spirit and scope of the present disclosure. Motion-based sensor system 130 detects motion-based behavior data as the individual executes a series of motions. For example, motion-based sensor system 130 can detect a sequence of positions the individual follows when tracing a pattern. Motion-based sensor system 130 tracks the speed of the individual's movements over time as the individual traces the pattern as well as other variables, such as location relative to the pattern, as is explained hereinafter.

As shown motion-based authentication computing device 110 streams the motion-based behavior data to motion-based sensor server 150 via network 120. Network 120 includes one or more networks, such as the Internet. In some embodiments of the present invention, network 120 may include one or more wide area networks (WAN) or local area networks (LAN). Network 120 may utilize one or more network technologies such as Ethernet, Fast Ethernet, Gigabit Ethernet, virtual private network (VPN), remote VPN access, a variant of IEEE 802.11 standard such as Wi-Fi, and the like. Communication over network 120 takes place using one or more network communication protocols including reliable streaming protocols such as transmission control protocol (TCP). These examples are illustrative and not intended to limit the present invention.

One or more motion-based sensor servers 150 may connect to one or more motion-based authentication computing devices 110 via network 120. Motion-based sensor servers 150 may include a data acquisition system, a data management system, intranet, conventional web-server, e-mail server, or file transfer server modified according to one embodiment. Motion-based sensor server 150 is typically a device that includes a processor, a memory, and a network interface, hereinafter referred to as a computing device or simply "computer." Motion-based sensor server 150 may store the motion-based behavior data captured by motion-based sensor system 130.

Motion-based authentication computing device 110, motion-based sensor server 150, and motion-based behavior data database 190 may share resources via network 120. For example, motion-based sensor server 150 may retrieve previously captured motion-based behavior data from the motions generated by the individual during previous identity authentication sessions via network 120. Motion-based authentication computing device 110 may also provide motion-based behavior data captured from the individual when tracing the pattern during each identity authentication session via network 120. Based on the cloud computing configuration, the interaction between motion-based authentication computing device 110, motion-based sensor server 150, and motion-based behavior data database 190 may not be limited to a single computing device. For example, a plurality of computing devices may update motion-based behavior data database 190 via network 120 with captured motion-based behavior data.

Motion-Based Identity Authentication

Motion-based authentication computing device 110 may authenticate the identity of the individual based on motion-based behavior data captured by motion-based authentication computing device 110 as the individual traces the pattern. An embodiment consistent with the invention compares the captured motion-based behavior data to previously captured motion-based behavior data that was previously captured by motion-based authentication computing device 110 from the individual during a previous log-in and/or authentication attempt. Based on the comparison, motion-based authentication computing device 110 determines whether to authenticate the identity of the individual or reject the identity authentication of the individual.

Figure 2:
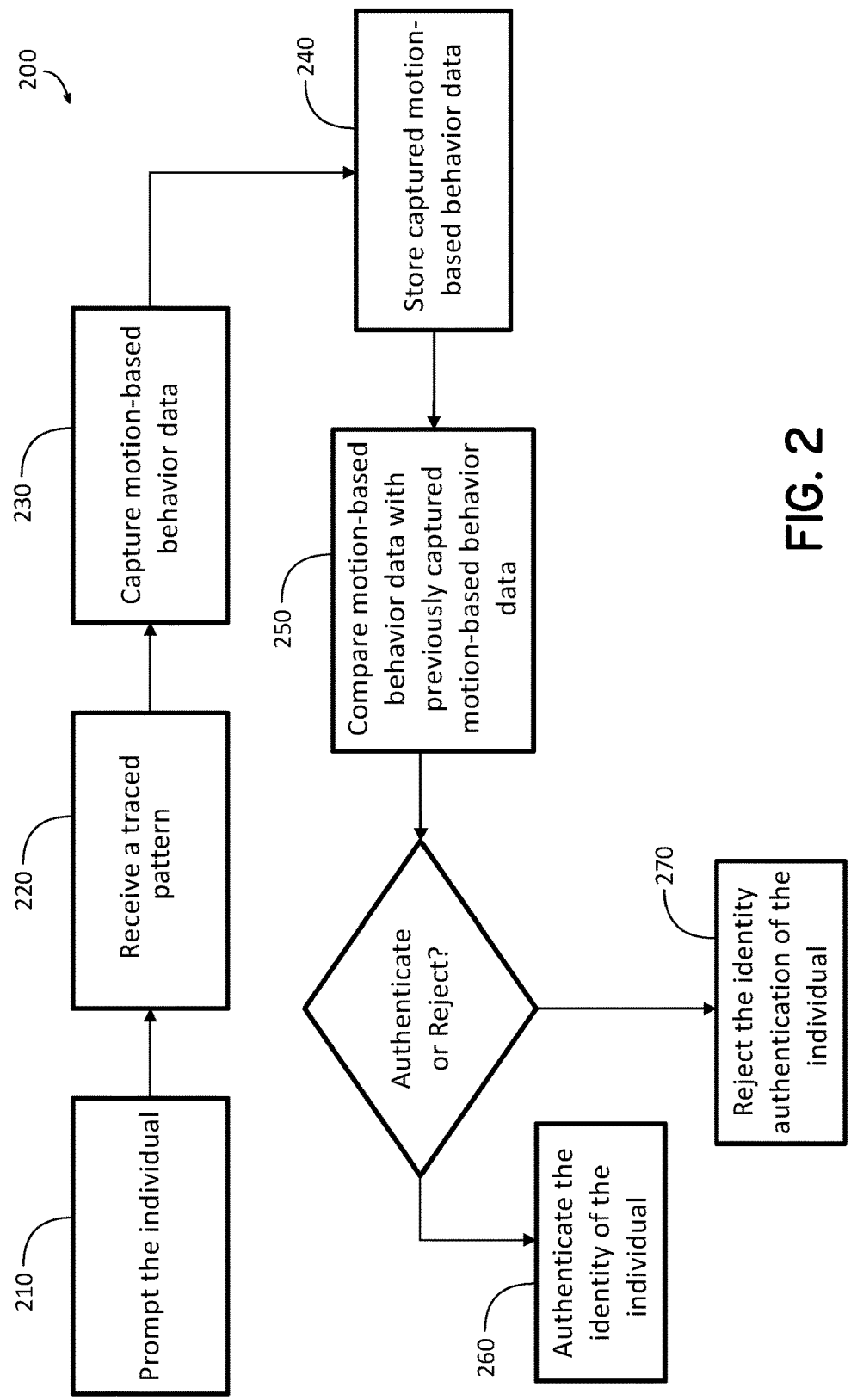
FIG. 2 is a flowchart showing an example method of securely authenticating an identity of an individual on the comparison of motion-based behavior data and previously captured motion-based behavior data.

One such implementation of authenticating the identity of the individual based on the comparison of motion-based behavior data to previously captured motion-based behavior data is illustrated by process 200 in FIG. 2. Process 200 includes seven primary steps: prompt the individual 210, receive a traced pattern 220, capture motion-based behavior data 230, store captured motion-based behavior data 240, compare motion-based behavior data with previously captured motion-based behavior data 250, authenticate the identity of the individual 260, and reject the identity authentication of the individual 270. Steps 210-270 are typically implemented in a computer, e.g., via software and/or hardware, e.g., motion-based authentication computing device 110 of FIG. 1.

In step 210, the individual may be prompted with an authentication template that includes the pattern for the individual to trace via user interface 140 with a plurality of motions executed by the individual. The individual may be any person who is engaged with an identity authentication session that is required by an entity so that the individual may then participate in activities supported by the entity after the identity of the individual is authenticated. The entity may be any organization that provides services to the individual, such as a bank, and/or receives services from the individual, such as the individual's employer, that requires the individual's identity be authenticated to prevent breaches of security of the entity and/or of the individual. The pattern that the individual is required to trace during the identity authentication session may be a three-dimensional and/or two-dimensional series of points and/or continuous paths displayed to the individual via user interface 140. The individual may be requested to trace the pattern via user interface 140 in order to have the identity of the individual authenticated. The pattern may be a two-dimension pattern where the individual traces the pattern via user interface 140 in two-dimensional space. The pattern may also be a three-dimension pattern where the individual traces the pattern via user interface 140 in three-dimensional space. The pattern may also include any combination of two-dimension patterns and three-dimension patterns.

In an embodiment, the individual may initially be provided the authentication template to the individual via user interface 140 when the individual is initially signing up for the identity authentication required by the entity. For example, the individual is initially provided the authentication template when the individual is initially enrolling as a customer of a bank. Each future identification authentication session engaged by the individual may be compared to the initial authentication template provided to the individual during the initial enrollment session. The individual may be provided the authentication template via user interface 140 for each authentication session that the individual engages. Each additional authentication template provided to the individual may include a substantially similar pattern as the pattern provided in the initial authentication template during the sign up stage for the individual. Each additional authentication template provided to the individual may be compared to the initial authentication template.

In an embodiment, user interface 140 may display the pattern included in the authentication template for the individual to trace. In another embodiment, user interface 140 may also audibly announce to the individual the pattern included in the authentication template that the individual is to trace. The individual may be prompted with the pattern to trace with any other method that adequately identifies to the individual of the pattern that the individual is to trace that will be apparent to those skilled in the relevant art(s) without departing from the spirit and scope of the present disclosure. In an example embodiment, step 210 may be performed by prompting module 970 as shown in FIG. 9.

After the authentication template is displayed to the individual via user interface 140, in step 220, a traced pattern generated as the individual traces the pattern displayed via user interface 140. The traced pattern may be received as the individual executes the plurality of motions to trace the pattern via user interface 140. The individual decides to begin the trace of the pattern at an initial point on the pattern and then continues to trace the pattern by following a path along the pattern until the pattern is traced completing the pattern at an end point. The traced pattern may be received via user interface 140 as the individual traces the pattern from the initial point to the end point. In an example embodiment, step 220 may be performed by transceiver 920 as shown in FIG. 9.

In step 230, motion-based behavior data that may be generated by the plurality of motions executed by the individual when tracing the pattern may be captured. Motion capturing sensors included in motion-based sensor system 130 may capture the motion-based behavior data as the individual executes the plurality of motions when tracing the pattern. The motion-based behavior data includes data that is unique to the individual when tracing the pattern with the plurality of motions.

The individual may have motion-based sensor system 130 coupled to them as the individual engages the pattern. The individual may also be within proximity of motion-based sensor system 130 so that the motion capturing sensors included in motion-based sensor system 130 can adequately capture the motion-based behavioral data generated from the plurality of motions executed by the individual when tracing the pattern. Motion-based sensor system 130 may continuously capture the motion-based behavior data beginning with the initial point of the individual's trace through the end point of the individual's trace of the pattern. The plurality of motions executed by the individual that generate the motion-based behavior data may include any bodily motion and/or relation between bodily motions that occur as the individual traces the pattern. The motion-based behavior data may include any data generated from the plurality of motions as the individual traces the pattern that is unique to the individual. The motion-based behavior data may be data that is relative to the musculoskeletal and neurological systems unique to the individual and cannot be substantially duplicated by an unauthorized individual tracing a substantially similar pattern as the individual.

The motion-based behavior data may also include but is not limited to finger length ratios, phalanx to metacarpal ratio for each finger, positions of each hand throughout the movement of the trace, positions of each finger throughout the movement of the trace, the sequence of the points connected during the trace, the sequence of the continuous path that is followed during the trace, the limbs involved in the movement, the speed of the movement for each axes of motion, the position of the limb engaged with the trace over time for each axes of motion, wrist angle over time, angular position of the wrist over time, angular velocity of the wrist over time, ratio of height, arm length, leg length, upper arm to forearm ratio, relative position of hands during movement, relative position of elbows during movement, relative position of shoulders during movement, the pressure applied to user interface 140 by the individual as the individual completes the trace and/or any other motion-based behavior data generated by the plurality of motions executed by the individual when tracing the pattern that is unique to the individual that will be apparent to those skilled in the relevant art(s) without departing from the spirit and scope of the present disclosure.

For example, the individual may be prompted with an authentication template that includes a three-dimensional pattern of dots for the individual to trace. The individual has a Leap Motion sensing input device by Leap Motion coupled to them. The individual begins to trace the three-dimensional pattern of dots with selecting a dot as the initial point of the trace. The individual begins the trace using their index finger and then continues to trace by connecting each remaining dot in the pattern with their index finger. The motion-based behavior data that includes the position of the hands and fingers of the individual as the individual begins the trace with the initial point may be captured and then continuously captures the position of the hands and fingers until the individual completes the pattern. The position of the hands and fingers may be captured by the Leap Motion sensing input device included in motion-based sensor system 130.

The position of the hands and fingers of the individual as the individual completes the trace of the dots for the three-dimensional pattern is unique to the individual. An unauthorized individual attempting to impersonate the individual when engaged in the authentication session would not be able to substantially duplicate the position of the hands and fingers of the individual. Assuming the unauthorized individual successfully selects the same dot as the individual to begin the trace and then successfully follows the same sequence of dots when completing the trace and successfully selects to do the trace with their index finger, the unauthorized individual would still not be able to substantially duplicate the position of the hands and fingers of the individual when completing the trace. The individual subconsciously positions their hands and fingers relative to the index finger in a comfortable and efficient manner so that the individual can most efficiently complete the pattern. Such positioning of the hands and fingers of the individual relative to the index finger that the finger are based on the musculoskeletal and neurological systems unique to the individual and cannot be substantially duplicated by an unauthorized individual having a different musculoskeletal and neurological system. Thus, adding security to the identity authentication session. In an example embodiment, step 230 may be performed by capturing module 940 as shown in FIG. 9.

After the motion-based behavior data generated by the plurality of motions executed by the individual when tracing the pattern is captured, in step 240, the captured motion-based behavior data in motion-based behavior data database 190. The captured motion-based behavior data is stored in motion-based behavior data database 190 as associated with the authentication of the identity of the individual. The captured motion-based behavior data associated with the individual as stored in motion-based behavior data database 190 may then be referenced for the identity authentication of the individual in future authentication sessions. In an example embodiment, step 240 may be performed by storing module 960 as shown in FIG. 9.

In step 250, the motion-based behavior data with previously captured motion-based behavior data. The previously captured motion-based behavior data associated with the individual may be stored in motion-based behavior data database 190. The previously captured motion-based behavior data may be captured from a previously traced pattern previously traced by the individual during a previous authentication session.

Each time the individual engages an authentication session for a specific entity, the individual may be prompted to trace the pattern provided in the authentication template. Each time the individual traces the pattern for each authentication session, the motion-based behavior data generated by each trace may be stored in motion-based behavior data database 190 as associated with the individual. As a result, motion-based behavior data database 190 continues to accumulate motion-based behavior data associated with the individual each time the individual engages in the authentication session and traces the pattern. The motion-based behavior data generated from the present trace of the pattern for the present authentication session may be compared to the previously captured motion-based behavior data accumulated in the motion-based behavior data database 190. Thus, the comparing may not be limited to simply comparing motion-based behavior data to the motion-based behavior data captured during the initial sign up session required by the entity but rather has access to the motion-based behavior data captured for each authentication session.

For example, the individual is prompted with an authentication template that includes a three-dimensional pattern of dots for the individual to trace each time the individual engages in the authentication session. Each time the individual completes the three-dimensional pattern of dots, the sequence of dots traced by the individual is stored in motion-based behavior data database 190. During the present authentication session, the individual begins to trace the three-dimensional pattern by selecting a first dot as the initial point of the trace and then follows a sequence of dots to complete the trace. The sequence of dots generated by the individual during the present authentication session is compared to each previous sequence of dots the individual followed when completing the same three-dimensional pattern when participating in each previous authentication session as stored in motion-based behavior data database 190.

In an embodiment, the motion-based behavior data captured each time the individual completes the trace of the pattern may be normalized using an interpolation technique. Each time the individual completes the trace of the pattern the individual may take a different amount of time to complete the trace of the pattern. For example, the individual may take 8 seconds the first time the individual completes the trace of the pattern, the individual may then take 5 seconds the second time, and the individual may take 10 seconds the third time.

An interpolation technique may be implemented to normalize the motion-based behavior data captured during the first, second, and third times the individual completed the trace of the pattern. The individual may be interpolated to be at a substantially similar location in the sequence of completing the trace relative to the amount of sequence completed. For example, a second dot of the trace of the pattern may be interpolated to be when having 60% of the trace completed. The motion-based behavior data captured at the first dot for each completed trace may then be normalized to being 60% completed with the trace rather than the amount of time taken to reach the second dot for each completed trace. In an example embodiment, step 250 may be performed by comparing module 980 as shown in FIG. 9.

After step 250 is completed, the identity of the individual may be authenticated or rejected. Step 260 is performed when the identity of the individual when the motion-based behavior data is within a threshold of the previously captured motion-based behavior data. As noted above, the motion-based behavior data generated by the plurality of motions executed by the individual when tracing the pattern are unique to the individual based on the unique musculoskeletal and neurological systems of the individual. An unauthorized individual who attempts to trace the same pattern may not generate motion-based behavior data similar to the individual.

However, certain motion-based behavior data generated by the individual also should not be substantially identical each time the individual traces the pattern. A slight variation in certain motion-based behavior data should occur each time the individual traces the pattern. Thus, the identity of the individual may be authenticated when the motion-based behavior data is within a threshold of previously captured motion-based behavior data. The threshold may be determined so that the threshold may be sufficiently wide to account for the slight variation in motion-based behavior data that occurs each time the individual traces the pattern so that the identity of the individual is properly authenticated. The threshold may be determined so that the threshold also may be sufficiently tight so that any significant variation in motion-based behavior data that likely signifies an imposter attempting to impersonate the individual would not be authenticated.

For example, each time the individual traces the pattern of dots with their index finger, the movement speed and position of the individual's index finger as the individual traces the pattern of dots is captured. The movement speed of the individual's index finger varies throughout the trace of the dots. The movement speed of the individual's index finger is faster when connecting a first dot to a second dot than the movement speed of the individual's index finger when connecting the second dot to a third dot.

Further, there is a low likelihood that the movement's speed and position of the individual's index finger will be substantially identical to a previous tracing of the dots. There should be a slight variation in the movement speed and position of the individual's index finger each time the individual completes the trace of the dots. There is also a low likelihood that an unauthorized individual when completing the same pattern of dots will have a movement speed and position of the unauthorized individual's index finger within the threshold variation of the individual's movement speed and position. There is a high likelihood that the unauthorized individual's movement speed and position of the unauthorized individual's second index finger may be significantly different (i.e., outside the threshold) from the movement speed and position of the individual's index finger.

The present movement speed and position of the individual's index finger when tracing the pattern for the current authentication session to each movement speed and position previously captured for each previous authentication session completed by the individual as stored in motion-based behavior data database 190. In order to authenticate the identity of the individual, present movement speed and position is to be within, for example, a +/−5% threshold of the previously captured movement speed. The present movement speed and position exceeds the previously captured movement speed and position by 4.5%. The identity of the individual is authenticated because the present movement speed and position is within the +/−5% threshold of the previously captured movement speed and position.

The threshold used to authenticate the identity of the individual may be customized for each motion-based behavior data. As noted above, the motion-based behavior data may be broken down to data associated with biometric characteristics and/or behaviometric characteristics of the individual. The biometric characteristics are related to the musculoskeletal system of the individual and may have little variation if any each time the individual traces the pattern but are not likely to be replicated by an unauthorized individual due to the uniqueness of the musculoskeletal system of the individual. The behaviometric characteristics are related to the neurological system of the individual and may have a slight variation each time the individual traces the pattern with little likelihood of being substantially identical to previous behaviometric characteristics generated during previous traces of the pattern. Further, an unauthorized individual may have a low likelihood of generating behaviometric characteristics within the threshold variation of the individual when tracing the same pattern despite the slight variation associated with such behaviometric characteristics. The behaviometric characteristics may also be substantially identical to previous behaviometric characteristics generated during previous traces of the pattern, such as the sequence of dots traced. Thus, the threshold associated with each motion-based behavior data may be customized to account for the little if any variation associated with biometric characteristics and the slight variation that may be associated with specific behaviometric characteristics.

For example, the ratio of height, arm length, and leg length captured from the individual as the individual traces the pattern is motion-based behavior data that is classified as biometric data and may have little if any variation each time the individual traces the pattern. The ratio of height, arm length, and leg length is a ratio that relates the individual's overall height to the individual's arm length to the individual's leg length. There is a low likelihood that this ratio may vary each time the individual completes the pattern yet there is also a low likelihood that an unauthorized individual may be able to provide a ratio within the threshold variation based on the uniqueness of the musculoskeletal system to the individual. Thus, the threshold associated with the ratio of height, arm length, and leg length may be tight due to the low likelihood of variation for the individual and is set at +/−2%.

In another example, angular position and velocity of the individual's wrist over time captured from the individual as the individual traces the pattern is motion-based behavior data that is classified as behaviometric data and may have slight variation each time the individual traces the pattern and may have a low likelihood of being substantially identical. There is a high likelihood that the angular position and velocity of the individual's wrist may slightly vary each time the individual completes the pattern yet there is a low likelihood that an unauthorized individual may be able to have an angular position and velocity within the threshold variation of the individual's wrist throughout the trace of the pattern based on the uniqueness of the neurological system to the individual. Thus, the threshold associated with the angular position and velocity of the individual's wrist over time may be sufficiently wide to allow for the slight variation each time the individual completes the trace yet sufficiently tight to exclude an attempt by an imposter and is set at +/−5%.

In another example, the sequence of dots being connected by the individual as the individual traces the pattern is motion-based behavioral data that is classified as behaviometric data but may not have a slight variation each time the individual traces the pattern. The sequence of dots selected by the individual to trace the pattern may be substantially identical each time the individual traces the pattern. Thus, the threshold associated with the sequence of dots being connected is set at 100%. Other examples of thresholds include a finger length ratio that is set at +/−2%, a phalanx to metacarpal ratio that is set at +/−2% and/or any other ratio that is sufficient to authenticate an individual that will be apparent to those skilled in the relevant art(s) without departing from the spirit and scope of the present disclosure. In an example embodiment, step 260 may be performed by authentication module 930 as shown in FIG. 9.

Step 270 is performed when the identity of the individual is rejected. The authentication of the identity of the individual is rejected when the motion-based behavior data is outside the threshold of the previously captured motion-based behavior data. The authentication of the identity of the individual may also be rejected when the motion-based behavior data that has been designated as requiring a slight variation is substantially identical to the previously captured motion-based behavior data.

As noted above, a customized threshold may be designated to each motion-based behavior data. The authentication of the identity may be rejected when any of the motion-based behavior data when compared to the respective previously captured motion-based behavior data is outside of the respective customized thresholds. Any of the motion-based behavior data that is outside of the respective customized thresholds when compared to the respective previously captured motion-based behavior data may signify that the attempt for identity authentication is not being completed by the actual individual resulting in a rejection of the authentication.

For example, each time the individual traces the pattern of dots, data that includes the individual uses their ring finger to complete the trace is captured and is stored in motion-based behavior data in motion-based behavior data database 190. An imposter attempting to log in as the individual attempts to complete an authentication session. The imposter is prompted with the same three-dimension pattern of dots presented to the individual for each authentication session. The imposter traces the three-dimension pattern of dots with their index finger rather than their ring finger. The use of the index finger is compared to the previous uses of the ring finger stored in motion-based behavior data database 190. The threshold determined for using the ring finger in completing the trace is 100%. The imposter failed to use the ring finger but rather used the index finger. Due to the 100% threshold, the identity authentication of the imposter is rejected.

The authentication of the identity may also be rejected when any of the motion-based behavior data when compared to the respective previously captured motion-based behavior data is substantially identical to the previously captured motion-based behavior data captured from any of the previous authentication sessions. Any of the motion-based behavior data that is substantially identical to the respective previously captured motion-based behavior data may signify that the attempt for identity authentication is not being completed by the actual individual resulting in a rejection of the authentication.

For example, the individual is prompted with an authentication template that includes a two-dimensional pattern of squares highlighted in a grid of squares for the individual to trace each time the individual engages in the authentication session. Each time the individual traces the highlighted grid of squares with their index finger, the relative position of the hands, elbows, and shoulder of the individual during the movement executed by the individual tracing the dots is captured. The relative position of the hands, elbows, and shoulder of the individual as the individual traces the pattern with their index finger is unique to musculoskeletal and neurological systems of the individual. There is a low likelihood that the individual may have a substantially identical relative position of the hands, elbows, and shoulder when connecting the dots as compared to any previously captured relative positions of the hands, elbows, and shoulder during previous authentication sessions. Rather, there may be a slight variation in the relative position of the hands, elbows, and shoulder each time the individual completes the trace of the dots but within a threshold of each previous trace.

An imposter when following the same sequence of squares in completing the trace as the individual with their index finger may also have a low likelihood of having a relative position of the hands, elbows, and shoulder within the threshold variation due to the uniqueness of the musculoskeletal and neurological systems of the individual. As noted above, the likelihood of even the individual providing a substantially identical relative position of the hands, elbows, and shoulder as compared to previous traces completed by the individual is low. As a result, any substantially identical relative position of the hands, elbows, and shoulder received may indicate a high likelihood that an imposter attempting to impersonate the individual has breached the security of the entity and stolen the relative position of the hands, elbows, and shoulder of the individual from a previous authentication session. There is also a high likelihood that the imposter is presently attempting to log in as the individual using the stolen relative position of the hands, elbows, and shoulder. Thus, due to the substantial identical aspects of the relative position of the hands, elbows, and shoulder received during the present authentication session to a previously captured relative position of the hands, elbows and shoulder, the identity authentication of the imposter is rejected. In an example embodiment, step 270 may be performed by rejection module 950 as shown in FIG. 9.

Three-Dimension Motion-Based Identity Authentication

As shown in FIG. 3A, an uncompleted authentication template 350 includes a plurality of dots 310(*a-d*) and a user interface 330. As shown in FIG. 3B, a completed authentication template 360 includes plurality of dots 310(*a-d*), a plurality of traces 320(*a-c*), user interface 330, and an index finger 340.

The individual requests to establish an authentication template so that the individual may log-in to the individual's computer system located in the individual's office space. The individual is prompted with uncompleted authentication template 350 via user interface 140. The uncompleted authentication template 350 may be a randomly generated plurality of dots 310(*a-d*) positioned in three-dimensional space and displayed to the individual by user interface 140. The individual may be requested to trace plurality of dots 310(*a-d*) in whatever way the individual feels comfortable and in whatever sequence the individual prefers. The individual may complete the trace of the plurality of dots 310(*a-d*) with the right hand, the left hand, a combination of the right and left hand, a right index finger, a left thumb, a combination of right fingers, a combination of left fingers, a combination of right fingers and left fingers, and/or any other appendage or combination of appendages used by the individual to complete the trace of the plurality of dots 310(*a-d*) that will be apparent to those skilled in the relevant art(s) without departing from the spirit and scope of the present disclosure. The individual may be requested to complete the trace of the plurality of dots 310(*a-d*) while standing with the individual's hands positioned above the individual's shoulders.

The individual may then position themselves with the individual's hands positioned above the individual's shoulders. The individual may then select to trace plurality of dots 310(*a-d*) with the individual's left index finger 340. The individual may initiate the trace of plurality of dots 310(*a-d*) with dot 310*a* as the initial point of the trace. The individual may then create trace 320*a* by connecting dot 310*a* with dot 310*b* by moving downwards from dot 310*a* to dot 310*b*. The individual may then create trace 320*b* by connecting dot 310*b* with dot 310*c* by moving upwards from dot 310*b* to dot 310*c*. The individual may then complete the pattern with trace 320*c* that connects dot 310*c* with dot 310*d* by moving upwards from dot 310*c* to dot 310*d*.

The individual may have motion-based sensor system 130 positioned ⅞ of an inch to within 1 meter from the individual that includes a volumetric sensor that is capable of capturing three-dimensional positional data in real-time of each of the individual's fingers. The three-dimension capturing capabilities of the volumetric sensor may capture additional data that cannot be captured in two-dimensional space. For example, the volumetric sensor may capture data from the rotational axis of the movements performed by the individual when completing the trace that cannot be captured in the two-dimensional space. An example of the volumetric sensor may include but is not limited to a Leap Motion sensing input device by Leap Motion. Motion-based sensor system 130 may be positioned any distance from the individual so that the volumetric sensor included in motion-based sensor system 130 may adequately capture the three-dimensional positional data in real-time of each of the individual's fingers that will be apparent to those skilled in the relevant art(s) without departing from the spirit and scope of the present disclosure.

The motion-based behavior data that is captured by the volumetric sensor of motion-based sensor system 130 as the individual completes the traces 320(*a-c*) of dots 310(*a-d*). For example, the three-dimensional location of each of the individual's fingers, each of the individual's finger joints, and/or palms as the individual completes the traces 320(*a-c*) of dots 310(*a-d*) is captured. As the individual completes the traces 320(*a-c*) of dots 310(*a-d*) with the individual's index finger 340, the three-dimensional data of where the other fingers of the individual are located relative to the individual's index finger 340 is captured. The captured motion-based behavior data is stored in motion-based behavior data database 190.

The user is then prompted with a second uncompleted authentication template 350 with plurality of dots 310(*a-d*). However, the individual is prompted to complete the trace of plurality of dots 310(*a-d*) while standing with the individual's hands at chest height rather than with the individual's hands above the individual's shoulders as previously prompted. The individual may then continue with completing the authentication template as discussed in detail above.

The individual is then prompted to complete uncompleted authentication template with plurality of dots 310(*a-d*) from numerous different positions so that motion-based behavior data may be captured as the individual traces plurality of dots 310(*a-d*) from different positions. Each time the individual completes uncompleted authentication template 350 from a different position, different motion-based behavioral data may be generated. As a result, the identity authentication of the individual is rejected when the individual logs into the computing system from a different position than when the individual first generated completed authentication template 360. The motion-based behavior data generated in the second position may be outside the threshold of the motion-based behavior data generated in the first position. For example, the individual may have their identity authentication rejected when the individual attempts to complete uncompleted authentication template 350 while sitting down because the motion-based behavior data generated may be outside the threshold from when the individual initially generated completed authentication template 360 while standing up.

The individual may not be limited to logging into their computing system from a single position. The generation of several different completed authentication templates 360 each relative to a different position of the individual may provide the individual flexibility to log-in to their computing system from different positions during future authentication sessions. The individual may not be limited to sitting in their chair, adjusting the chair to the appropriate height, and/or positioning the chair at the right position from user interface 140 so that the individual's identity is properly authenticated. For example, the individual is prompted to complete uncompleted authentication templates 350 in positions that include but are not limited to standing with hands above the individual's shoulders, standing with hands at the height of the individual's chest, standing with hands at the individual's waist, sitting with hands above the individual's shoulders, sitting with hands at the height of the individual's chest, sitting with hands at the individual's waist and/or any other position that the individual may encounter uncompleted authentication template 350 when attempting to log-in to the individual's computing system that will be apparent to those skilled in the relevant art(s) without departing from the spirit and scope of the present disclosure.

The motion-based behavior data is captured from each completed authentication template 360 from each position of the individual and is stored in the motion-based behavior data in motion-based behavior data database 190. Each time the individual engages an identity authentication session from a specific position, the motion-based behavior data captured from that position is compared to the motion-based behavior data stored in motion-based behavior data database 190 to previously captured motion-based behavior data. Because motion-based behavior data has been previously captured and stored for different positions, the identity of the individual is authenticated when the motion-based behavior data captured from the individual's current position is within the threshold of previously captured motion-based behavior data stored in motion-based behavior data database 190. The presence of previously captured motion-based behavior data stored in motion-based behavior data database 190 that is within the threshold of the motion-based behavior data associated with the individual's current position indicates that the individual has previously had their identity successfully authenticated from that current position and should have their identity authenticated for the present authentication session.

Two-Dimension Motion-Based Identity Authentication

Figure 4:
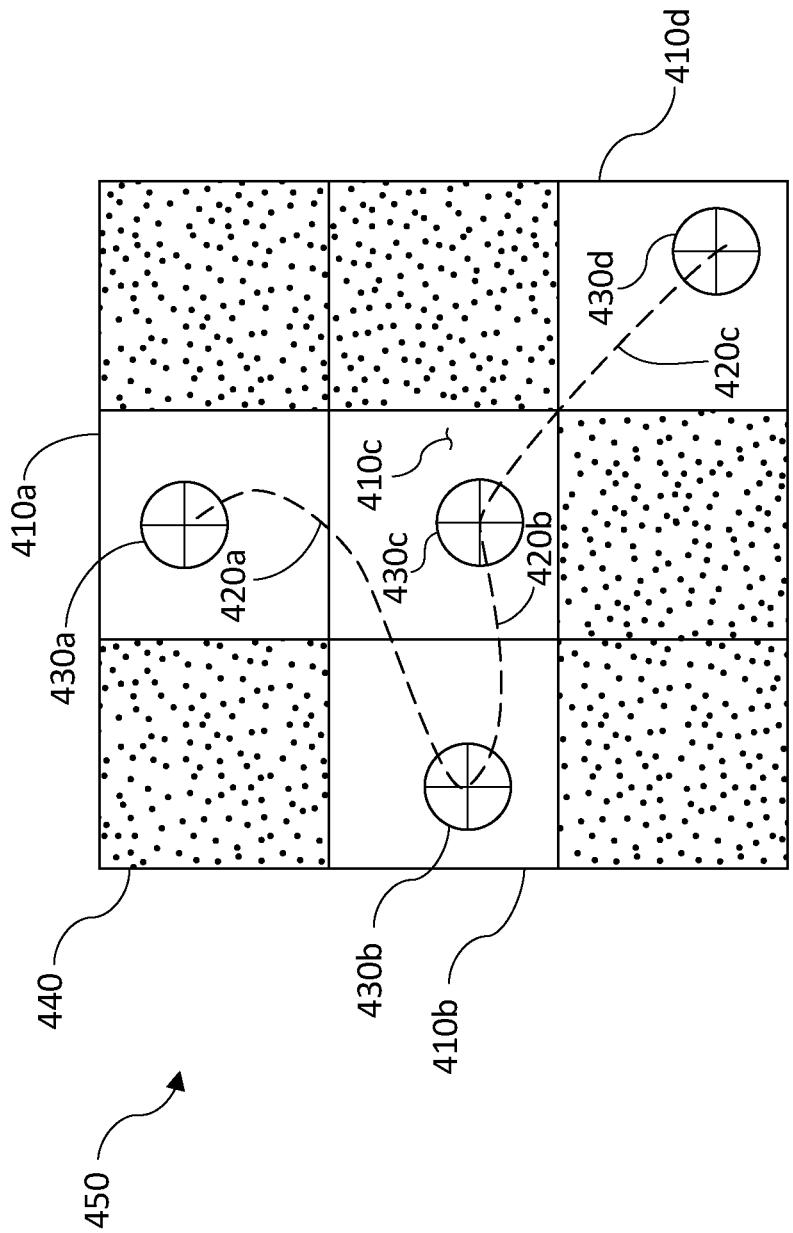
FIG. 4 depicts a detailed view of an exemplary two-dimension motion-based identity authentication template for authenticating an individual's identity based on motions executed by the individual in two-dimensions.

As shown in FIG. 4, an authentication template 450 includes a plurality of squares 410a through 410d, a plurality of paths 420a through 420c, a plurality of points 430a through 430d, and a user interface 440.

The individual requests to establish an authentication template so that the individual may enter into a high security area. The individual is prompted to complete authentication template 450 via user interface 440. Authentication template 450 may include squares positioned in a grid in two-dimension space, such as a 3×3 grid for example, and displayed to the individual via user interface 440. A randomly generated combination of squares may then be highlighted forming a pattern, such as plurality of squares 410a through 410d for example, for the individual to trace together while leaving the remaining squares in the 3×3 grid unhighlighted. The individual may be requested to trace plurality of squares 410a through 410d in whatever way the individual feels comfortable and in whatever sequence the individual prefers. The individual may also be requested to complete the trace of plurality of squares 410a through 410d while standing approximately 1 meter from motion-based sensor system 130.

The individual may then position themselves while standing approximately 1 meter from motion-based sensor system 130 where footprints may be positioned on the floor signifying to the individual to stand on the footprints so that the individual is standing approximately 1 meter from motion-based sensor system 130. The individual may then select to trace plurality of squares 410a through 410d with the individual's index finger or hand. The individual may initiate the trace of plurality of squares 410a through 410d with square 410a as the initial point of the trace. The individual may specifically initiate the trace with point 430a included in square 410a. The individual may then create trace 420a by moving their index finger from point 430a to point 430b included in square 410b and thus connecting square 410a to square 410b. Once the individual reaches point 430b, the individual decides to change direction and begin trace 420b from point 430b to point 430c included in square 410c and thus connecting square 410b to square 410c. Once the individual reaches point 430c, the individual decides to change direction and begin trace 420c from point 430c to point 430d included in square 410d and thus connecting square 410c to square 410d and completing the pattern.

The individual may have motion-based sensor system 130 positioned 1 meter to 3.5 meters from the individual that includes a sensor that is capable of capturing two-dimensional data generated from the motions executed by the individual when tracing plurality of squares 410a through 410d in real-time. An example of the sensor may include but is not limited to a Kinect motion sensing input device by Microsoft. The Kinect motion sensing input device by Microsoft includes two optical cameras an infrared camera that capture the two-dimensional data generated by the individual. Motion-based sensor system 130 may be positioned any distance from the individual so that the sensor included in motion-based sensor system 130 may adequately capture the two-dimensional data that will be apparent to those skilled in the relevant art(s) without departing from the spirit and scope of the present disclosure.

The motion-based behavior data that is obtained by the sensor of motion-based sensor system 130 is captured as the individual completes the traces 420a through 420c of squares 410a through 410d. For example, the upper arm to forearm ratio of the arm that the individual uses to complete the traces 420a through 420c is captured. The upper arm to forearm ratio is the distance of the individual's arm going from the individual's elbow to the individual's shoulder relative to the distance going from the individual's elbow to the individual's hand. The individual's upper arm to forearm ratio is a biometric characteristic that is based on the individual's unique musculoskeletal system and has a low likelihood of being replicated by an unauthorized individual. The captured motion-based behavior data is stored in motion-based behavior data database 290.

The individual may then be prompted to complete authentication template 450 at a distance of 2.5 meters from motion-based sensor system 130 and at a distance of 3 meters from motion-based sensor system 130. The individual may also be prompted to complete authentication template 450 at each distance in a sitting position and in a standing position. The generation of several authentication templates by the individual in a variety of positions and/or distances from motion-based sensor system 130 provides flexibility to the individual to execute future identification sessions from different positions as discussed in detail above.

The upper arm to forearm ratio from each completed authentication template 450 is captured from each position of the individual and distance the individual is from motion-based sensor system 130 and storing module 960 stores the upper arm to forearm ratio in motion-based behavior data database 190. Each time the individual engages an identity authentication session from a specific position and distance, the upper arm to forearm ratio from that position and distance is compared to previously captured upper arm to forearm ratios stored in motion-based behavior data database 190. The identity of the individual may then be authenticated as discussed in detail above and/or rejected as discussed in detail above.

An Exemplary Authentication Technique Using Motion-Based Behavior Data

As discussed in detail above, motion-based authentication computing device 110 may authenticate the identity of the individual based on motion-based behavior data captured by motion-based authentication computing device 110 as the individual traces the pattern. As discussed in detail above, an embodiment consistent with the invention compares the captured motion-based behavior data to previously captured motion-based behavior data that was previously captured by motion-based authentication computing device 110 from the individual during a previous log-in and/or authentication attempt.

An exemplary authentication technique according to embodiments of the present invention using motion-based behavior data to be discussed in further detail below regarding the identity authentication of the individual is based on an inter-relationship of each motion-based behavior data. The inter-relationship of the data determines how each individual piece of data impacts each other piece of data captured from the trace.

For example, the inter-relationship of the velocity and the x-coordinates and y-coordinates from the trace includes how the velocity of the trace impacts the x-coordinates and y-coordinates of the trace. If an individual maintains a high velocity throughout the trace, the x-coordinates and y-coordinates of the trace may have less accuracy relative to the pattern in that a higher quantity of the x-coordinates and y-coordinates of the trace may be located outside of the pattern. If an individual maintains a low velocity throughout the trace, the quantity of x-coordinates and y-coordinates of the trace may be more aligned with the pattern. The inter-related motion-based behavior data with the inter-related previously captured motion-based behavior data may then be compared to each other.

For example, the impact of the velocity on the x-coordinates and y-coordinates captured from the current trace may be compared to the impact of the velocity on the x-coordinates and y-coordinates captured from the previous trace. Thus, the identity authentication of the individual based on the inter-relationship of each piece of motion-based behavior data provides an additional layer of authentication. An impostor attempting to log-in as the individual would not only have to trace the pattern so that each piece of motion-based behavior data falls within the threshold to be authenticated, but would also have to have a similar inter-relationship between each piece of motion-based behavior data to successfully log-in as the individual.

Figure 5:
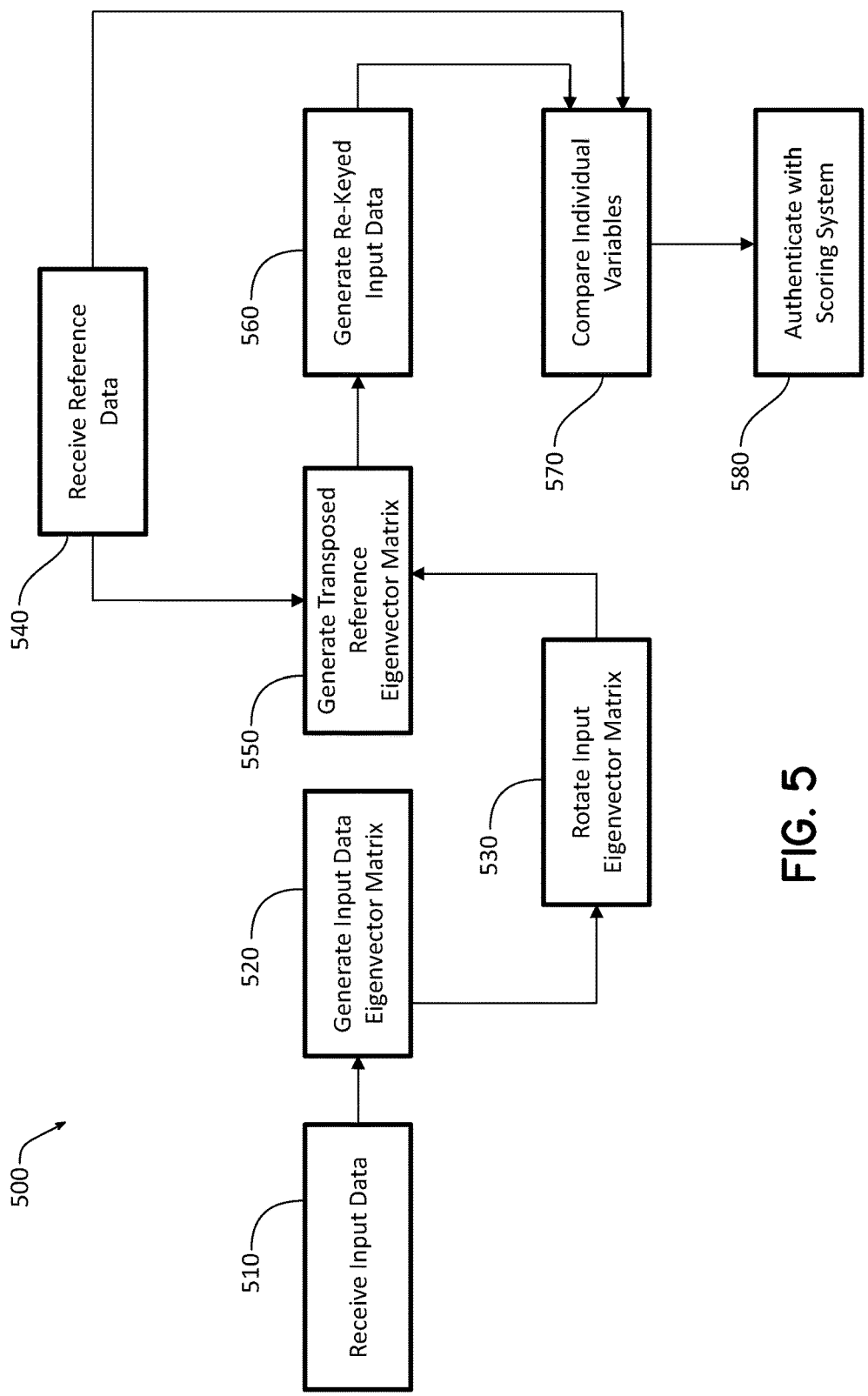
FIG. 5 is a flowchart showing an example method of securely authenticating an identity of an individual based on their inter-relationship of motion-based behavior data and the inter-relationship of the previously captured motion-based behavior data.

One such implementation of authenticating the identity of the individual based on the inter-relationship of motion-based behavior data and the inter-relationship of the previously captured motion-based behavior data is illustrated by process 500 in FIG. 5. Process 500 includes eight primary steps: receive input data 510, generate input eigenvector matrix 520, rotate input eigenvector matrix 530, receive reference data 540, generate reference eigenvector matrix 550, generate re-keyed input data 560, compare individual variables 570, and authenticate with a scoring system 580, each of which will be discussed in greater detail below. Steps 510-580 are typically implemented in a computer, e.g., via software and/or hardware, e.g., motion-based authentication computing device 110 of FIG. 1.

In step 510, input data may be received as the individual completes the trace of the pattern when attempting to have their identity authenticated. Step 510 has been discussed in detail above relative to the capturing of input data where the input data is the motion-based behavior data captured during subsequent identification sessions after the individual has initially completed the authentication template. The individual initially completes the authentication template when initially signing up for the identity authentication required by the entity. The individual then completes the authentication template each subsequent time the individual attempts to log-in and/or have their identity authenticated by the identity which is when the motion-based behavior data is generated.

For ease of discussion, motion-based behavior data captured as the individual completes a subsequent trace after completing the initial authentication template will be referred to as input data. Each instance that the individual attempts to have their identity authenticated by tracing the pattern, the time the individual takes to complete the pattern may vary. As noted above, a threshold may be assigned to the time taken for the individual to complete the trace, such as +/−5%. As a result, comparing the input data based on the time required to complete each trace may distort the comparison. The amount of time required by the individual to reach each x-coordinate and y-coordinate on the trace of the pattern may be different for each trace completed by the individual.

For example, the individual may take 1 second to complete the trace when completing the initial authentication template and then take 1.25 seconds to complete a subsequent trace. Comparing the input data at the end point of the initial trace that took 1 second to complete to the input data at the end point of the subsequent trace that took 1.25 seconds may be distorted and not provide an accurate comparison to authenticate the identity of the individual. As a result, the input data may be normalized relative to the transition of the movement by the individual in completing the trace from 0%-100% rather than a time period to complete the trace. The input data relative to where in the trace that the input data was captured may provide a more accurate comparison to where in the trace that the previously captured data was captured.

FIG. 6A provides an example input data matrix 610 for the individual completing the trace of the pattern in a subsequent attempt to log-in and/or have their identity authenticated by the entity after completing the initial authentication template. For this example, the individual is completing a trace of a β pattern which is shown as subsequent trace 705 in FIG. 7A. Subsequent trace 705 includes initial point 710a, second point 715a, third point 720a, fourth point 725a, and end point 730a. As noted above, the pattern may include any type of pattern that may be traced to provide motion-based behavior data that will be apparent to those skilled in the relevant art(s) without departing from the spirit and scope of the invention.

Further for this example, the input data includes the x-coordinate position on the β pattern, the y-coordinate position on the β pattern and the velocity relative to each x-coordinate position and y-coordinate position in completing the trace of the β pattern. Although this example provides three examples of input data for simplicity, any quantity of motion-based behavior data listed above may be used in a similar fashion as the following example will explain to authenticate the identity of the individual based on the inter-relationship of the motion-based behavior data that will be apparent to those skilled in the relevant art(s) without departing from the spirit and scope of the invention.

Further for this example, the values provided by example input data matrix 610 represent the x-coordinate position, y-coordinate position, and the velocity for five different points along the subsequent trace 705 of the β pattern. The first row is the x-coordinate position, y-coordinate position and velocity at the initial point 710a of the subsequent trace 705 of the β pattern and the last row is the x-coordinate position, y-coordinate position and the velocity at the end point 730a of the subsequent trace 705. The second, third, and fourth rows are the x-coordinate positions, y-coordinate positions, and velocities at three other sequential points 715a, 720a, and 725a along the subsequent trace 705. Although this example provides five positions along the trace of the β pattern where the x-coordinate positions, y-coordinate positions, and velocities that were captured during the trace for simplicity, any quantity of positions along the trace of the β pattern may be used for the corresponding input data to authenticate the identity of the individual that will be apparent to those skilled in the relevant art(s) without departing from the spirit and scope of the invention.

The x-coordinate position, the y-coordinate position, and the velocity captured from the trace corresponds to initial point 710a, second point 715a, third point 720a, fourth point 725a and end point 730a on subsequent trace 705. For example, the x-coordinate position and the y-coordinate position as provided in the first row of example input data matrix 710 provide the values of 1 and 1, respectively, which signifies that the x-coordinate position and the y-coordinate position relative to each other are in the same initial location (initial point 710a) of subsequent trace 705. However, the x-coordinate position at second point 715a is 2 while the y-coordinate position at second point 715a is 5 due to the individual choosing to trace the β pattern by going from the bottom of the tail of the β pattern (initial point 710a) to the top of the β pattern (second point 715a) of subsequent trace 705.

The velocity value of 5 at initial point 710a and then the decrease in values from 4 to 3 to 2 to 1 relative to the second point 715a, third point 720a, fourth point 725a and end point 730a of subsequent trace 705 signifies that the individual began the trace of the β pattern with a high velocity up the tail of the β pattern and then slowed down to complete the rest of the trace of the β pattern. The following steps of process 500 may maintain this inter-relationship of the x-coordinate position, y-coordinate position, and velocity to authenticate the identity of the individual. Example input data matrix 610 includes integer values relating the x-coordinate position, y-coordinate position, and velocity. However, these values are arbitrary values used for simplicity. The actual values may be values relative to the motion-based authentication computing device 110 that captures the input data (e.g., Cartesian coordinate system of user interface 140) and/or any other modification to the input data so that the inter-relationship of the input data may be analyzed to authenticate the identity of the individual that will be apparent to those skilled in the relevant art(s) without departing from the spirit and scope of the invention. In an example embodiment, step 510 may be performed by transceiver 920 as shown in FIG. 9.

In step 520, an input eigenvector matrix may be generated. In generating the input eigenvector matrix, a covariance matrix for the input data may first be generated. As noted above, the inter-relationship of each piece of input data to each other is to be maintained through the analysis of authenticating the identity of the individual. The covariance matrix of the input data determines the inter-relationship of the input data. Example input data covariance matrix 620 depicted in FIG. 6B is the covariance matrix for example input data matrix 610. Example input data covariance matrix 620 compares each piece of input data to each other piece of input data to determine the impact that each piece of input data had on each other piece of input data during the subsequent trace 705 of the β pattern. As can be seen in example input data covariance matrix 620, the x-coordinate position is compared to itself, y-coordinate position, and the velocity throughout the subsequent trace 705 to determine the impact the x-coordinate position had on itself, the y-coordinate position, and the velocity throughout the subsequent trace 705. Example input data covariance matrix 620 determines the impact that the y-coordinate position and the velocity had on the x-coordinate position, y-coordinate position and the velocity in a similar fashion.

For example, FIG. 7A depicts identity authentication of the individual based on an independent comparison of motion-based behavior data. Example independent comparison of motion-based behavior data 700 depicts a comparison of input data generated by subsequent trace 705 to a previous authentication trace 735. The previous authentication trace 735 may have been completed by the individual during a previous authentication attempt. The previous authentication trace 735 includes initial point 710b, second point 715b, third point 720b, fourth point 725b, and end point 730b. Example independent comparison of motion-based behavior data 700 independently compares the x-coordinate position of the subsequent trace 705 to the x-coordinate position of the previous authentication trace 735 and determines whether the x-coordinate position is within the threshold for the individual to authenticate the individual.

However, example inter-related comparison of motion-based behavior data 750 shown in FIG. 7B depicts a comparison of the inter-relationship of the input data by adjusting the input data to account for the inter-relationship of the input data. Adjusted subsequent trace 755 depicts the adjustment of the input data that accounts for the inter-relationship of the input data as generated in example input data covariance matrix 720. The adjusted subsequent trace includes initial point 710c, second point 715c, third point 720c, fourth point 725c, and end point 730c. As can be seen in FIG. 7B, the adjusted subsequent trace 755 has a rightward bias applied to it as compared to the subsequent trace 705. For example, fourth point 725*c* is further to the right in adjusted subsequent trace 755 as compared to fourth point 725*a* in subsequent trace 705.

In such an example, the velocities captured during the subsequent trace 705 had an impact on the x-coordinate positions and the y-coordinate positions. The impact was captured in the example input data covariance matrix 720 that determined the inter-relationship between the velocities and the x-coordinate positions and the y-coordinate positions. The impact is visible in the rightward bias of the adjusted subsequent trace 755 as compared to the subsequent trace 705. As will be discussed in further detail below, an imposter would not only have to have each piece of input data independently fall within thresholds, but would also have to impersonate the impact that the velocities have on the x-coordinate positions and the y-coordinate positions to generate an adjusted subsequent trace that is within a threshold of the adjusted subsequent trace 755 to successfully log-in as the individual.

After example input data covariance matrix 720 is generated, an eigenvector matrix for the input data may be generated from example input data covariance matrix 720. As noted above, the input data obtained from the subsequent trace 705 is to be compared to the previously captured motion-based behavior data captured from the previous authentication trace 735. For ease of discussion, previously captured motion-based behavior data captured as the individual completes a previous authentication trace, e.g., completing the initial authentication template, will be referred to as reference data.

In order to adequately compare the input data from the subsequent trace 705 to the reference data from the previous authentication trace 735, the data is to be compared relative to the inter-relationship of the input data to the inter-relationship of the reference data. Transforming the input data and the reference data into respective eigenvector matrices provides the multi-variable statistical analysis capability to adequately compare the input data to the reference data while maintaining the inter-relationship of the input data and the reference data. Example input data eigenvector matrix 630 that is depicted in FIG. 6C is the input data eigenvector matrix for the input data derived from example input data covariance matrix 620. In an example embodiment, step 520 may be performed by comparing module 980 as shown in FIG. 9.

In step 530, example input data eigenvector matrix 630 may be rotated. As noted above, transforming the input data and the reference data into respective eigenvector matrices adequately compares the input data to the reference data while maintaining the inter-relationship of the input data and the reference data. In order to compare the inter-relationship of the input data and the reference data, the input vectors included in example input data eigenvector matrix 630 may be rotated.

For example, the input data included in example input data eigenvector matrix 630 may be rotated 90 degrees. In order to rotate the input vectors included in example input data eigenvector matrix 630, example input data eigenvector matrix 630 may be multiplied with example input data matrix 610 to generate example rotated input eigenvector matrix 640 as shown in FIG. 6D. Example rotated input eigenvector matrix 640 exhibits that the input vectors included in example input data eigenvector matrix 630 relative to the input data included in example input data matrix 610 have been rotated 90 degrees. The input vectors may be rotated in any fashion to compare the input data to the reference data while maintaining the inter-relationship for each that will be apparent to those skilled in the relevant art(s) without departing from the spirit and scope of the invention. In an example embodiment, step 530 may be performed by comparing module 980 as shown in FIG. 9.

In step 540, reference data may be received from motion-based behavior data database 190. Step 540 has been discussed in detail above where the reference data has been stored in motion-based behavior data database 190 and then is retrieved to be compared to the input data once the input data has been captured. As noted above, the reference data includes previously captured motion-based behavior data captured as the individual completes a previous authentication trace, e.g., completing the initial authentication template. The reference data is captured before the input data and is stored in motion-based behavior data database 190. After the input data has been captured, the reference data may be retrieved from motion-based behavior data database 190 to be processed and then compared to the input data while maintaining the inter-relationship between the reference data and the input data.

FIG. 6E provides an example reference data matrix 650 for the individual completing the trace of the pattern in a previous attempt to establish an authentication template and/or a previous log-in attempt. As noted above, the individual is completing the trace of the β pattern which is shown as previous authentication trace 735 in FIG. 7. The x-coordinate position, the y-coordinate position, and the velocity captured from the trace corresponds to initial point 710*b,* second point 715*b,* third point 720*b,* fourth point 725*b* and end point 730*b* on previous authentication trace 735. In an example embodiment, step 540 may be performed by transceiver 920 as shown in FIG. 2.

In step 550, a transposed reference eigenvector matrix may be generated. In generating the transposed reference eigenvector matrix, a covariance matrix for the reference data may first be generated. The covariance matrix of the reference data determines the inter-relationship of the reference data. Example reference data covariance matrix 660 depicted in FIG. 6F is the covariance matrix for example reference data covariance matrix 660. Example reference data covariance matrix 660 compares each piece of reference data to each other piece of reference data to determine the impact that each piece of reference data had on each other piece of reference data during the previous authentication trace 735 of the β pattern. As can be seen in example reference data covariance matrix 660, the x-coordinate position is compared to itself, y-coordinate position, and the velocity throughout the previous authentication trace 735 to determine the impact the x-coordinate position had on itself, the y-coordinate position, and the velocity throughout the previous authentication trace 735. Example reference data covariance matrix 660 determines the impact that the y-coordinate position and the velocity had on the x-coordinate position, y-coordinate position and the velocity in a similar fashion.

After example reference data covariance matrix 660 is generated an eigenvector matrix for the reference data may be generated from example reference data covariance matrix 660. In order to adequately compare the input data from the subsequent trace 705 to the reference data from the previous authentication trace 735, the data is to be compared relative to the inter-relationship of the input data to the inter-relationship of the reference data. Transforming the input data and the reference data into respective eigenvector matrices provides the multi-variable statistical analysis capability to adequately compare the input data to the reference data while maintaining the inter-relationship of the input data and the reference data. Example reference data eigenvector matrix 670 that is depicted in FIG. 6G is the reference data eigenvector matrix for the reference data derived from example reference data covariance matrix 660.

After example reference data eigenvector matrix 670 is generated a transpose of example reference data eigenvector matrix 670 may be generated. After the input vectors included in example input data eigenvector matrix 630 have been rotated, the input vectors may then be rotated back into their original coordinate space while being projected onto the reference vectors included in example reference data eigenvector matrix 670 with the transpose of the example reference data eigenvector matrix 670. The transpose of the reference data eigenvector matrix 670 provides the crossover of the input data to the reference data so that the inter-relationship of the input data may be compared to the inter-relationship of the reference data. Example transpose reference data eigenvector matrix 680 that is depicted in FIG. 6H is the transpose of example reference data eigenvector matrix 670. In an example embodiment, step 550 may be performed by comparing module 980 as shown in FIG. 9.

In step 560, a re-keyed input data matrix may be generated. As noted above, transforming the input data and the reference data into respective eigenvector matrices provides the multi-variable statistical analysis capability to adequately compare the input data to the reference data while maintaining the inter-relationship of the input data and the reference data. The rotated input vectors in example input data eigenvector matrix 630 may be rotated back into their original coordinate space while being projected onto the reference vectors included in example reference data eigenvector matrix 670. The projection of the rotated input vectors onto the reference vectors provides an adequate comparison of the inter-relationship of the input data to the inter-relationship of the reference data. The rotated input vectors in example input data eigenvector matrix 630 may be rotated back into their original coordinate space while be projected onto the reference vectors included in example reference data eigenvector matrix 670 by multiplying example input data eigenvector matrix 630 with transpose reference data eigenvector matrix 680. The multiplying of example input data eigenvector matrix 630 with transpose reference data eigenvector matrix 680 may provide example re-keyed input data matrix 690 that is depicted in FIG. 6I.

As noted above, FIGS. 7A and 7B depict a comparison between identity authentication of the individual based on an independent comparison of input data to reference data (example independent comparison of motion-based behavior data 700) to an inter-related comparison of input data to reference data (example inter-related comparison of motion-based behavior data 750). Re-keyed input data matrix 790 includes the reference data depicted in adjusted subsequent trace 755 that accounts for the inter-relationship of the input data. As can be seen in FIG. 7B, the adjusted subsequent trace 755 has a rightward bias applied to it as compared to the subsequent trace 705 due to the impact of the velocities to the x-coordinate positions and the y-coordinate positions of the adjusted subsequent trace 755.

For example, the input data for the fourth point 725*a* regarding the subsequent trace 705 as shown in example input data matrix 610 is 4 for the x-coordinate position, 3 for the y-coordinate position, and 2 for the velocity. The reference data for the fourth point 725*b* regarding the previous authentication trace 735 as shown in example reference data matrix 650 is 3 for the x-coordinate position, 3 for the y-coordinate position, and 3 for the velocity. As can be seen in example independent comparison of motion-based behavior data 700, the x-coordinate position for the subsequent trace 705 is slightly greater than the x-coordinate position for the previous authentication trace 735 while the y-coordinate positions for both are similar.

The re-keyed input data for the fourth point 725*c* regarding the adjusted subsequent trace 755 as shown in example re-keyed input data matrix is 5.38 for the x-coordinate position, 2.59 for the y-coordinate position and 2.5 for the velocity. As can be seen in example inter-related comparison of motion-based behavior data 750, the x-coordinate position for the adjusted subsequent trace 755 is slightly greater than the x-coordinate position of the previous authentication trace 735 and the y-coordinate position is slightly less than the y-coordinate position of the previous authentication trace 735 due to the inter-relationship of the velocity to the x-coordinate position and the y-coordinate position. In an example embodiment, step 560 may be performed by comparing module 980 as shown in FIG. 9.

In step 570, the individual variables included in example re-keyed input data matrix 690 may be compared to the individual variables included in example reference data matrix 650. After the input data has been projected onto the reference data and rotated back into its original coordinate space as provided by example re-keyed input data matrix 690, each re-keyed input data is in a condition to be adequately compared to the reference data while maintaining the inter-relationship between each variable. For example, the re-keyed input variable of the x-coordinate position at initial point 710*c* on adjusted subsequent trace 755 is compared to the reference variable of the x-coordinate position at initial point 710*b* on previous authentication trace 735. The re-keyed x-coordinate position incorporates the impact of the velocity on the x-coordinate position and can be compared to the reference x-coordinate position. The re-keyed input data may be compared to the reference data in a similar fashion the motion-based behavior data is compared to the previously captured motion-based behavior data. In an example embodiment, step 570 may be performed by comparing module 980 as shown in FIG. 9.

In step 580, the individual's identity may be authenticated and/or rejected. As discussed in detail above in FIG. 2 regarding authenticating and rejecting, the identity of the individual may be authenticated and/or rejected based on the comparison of the re-keyed input data to the reference data. The identity of the individual may be authenticated when motion-based behavior data is within a threshold of previously captured motion-based behavior data. The authentication of the identity individual may be rejected when the motion-based behavior data is outside a threshold of previously captured motion-based behavior data.

An exemplary threshold determination technique according to embodiments of the present disclosure determine the threshold for each input variable based on learning the fluctuation that the individual has for each input variable during each subsequent trace. Each time the individual completes the trace of the pattern, the fluctuation for each input variable for the trace may be recorded and then the threshold for each input variable may be determined based on the learned fluctuation. The individual may have greater fluctuation for specific input variables while having less fluctuation regarding other input variables.

For example, the individual may approach the trace of the pattern with a relatively slow velocity in order to maintain the accuracy of the x-coordinate positions and the y-coordinate positions within the pattern. As a result, the individual may have little fluctuation in the x-coordinate positions and y-coordinate positions each time the individual completes the trace while the velocities at each point on the trace may have greater fluctuations. In such an example, the slight fluctuations in the x-coordinate positions and the y-coordinate positions may be recorded and the threshold required to authenticate the identity of the individual based on the x-coordinate positions and the y-coordinate positions is determined as +/−5%. The greater fluctuations in velocities may be recorded and the threshold required to authenticate the identity of the individual based on velocities is determined as +/−10%. The identity of the individual may be authenticated and/or rejected based on the determined thresholds. As a result, the thresholds for each input variable may be customized to the individual.

The identity of the individual may be authenticated and/or rejected based on a scoring system. The quantity of input variables that the individual was within the determined threshold and the quantity of input variables that the individual was outside the determined threshold may be tallied and a score based on the tally may be determined. The identity of the individual may be authenticated when the score is above a threshold and the identity of the individual may be rejected when the score is below the threshold. The threshold that the score is to exceed to authenticate the identity of the individual may be when 100% of the thresholds for each input variable have been satisfied, a percentage of the thresholds that have been satisfied, 100% of selected thresholds for selected input variables have been satisfied, based on statistical analysis of the satisfied thresholds, based on weights applied to each satisfied threshold, and/or any other scoring technique to accurately authenticate and/or reject the identity of the individual that will be apparent to those skilled in the relevant art(s) without departing from the spirit and scope of the invention.

Multi-Layer Identity Authentication Using Motion-Based Identity Authentication

Motion-based authentication computing device 110 may authenticate the identity of the individual with multiple layers of identity authentication. Motion-based authentication computing device 110 may first prompt the individual with a security question. If the individual correctly answers the security question, motion-based authentication computing device 110 may then display to the individual via user interface 140 a pattern for the individual to trace. Motion-based authentication computing device 110 may authenticate the identity of the individual based on motion-based behavior data captured by motion-based authentication computing device 110 as the individual traces the pattern. An embodiment consistent with the invention then confirms the authentication with the entity that the individual is attempting to engage. Motion-based authentication computing device 110 may then receive a personal identification number (PIN) from an identification server 915 associated with the entity. Motion-based authentication computing device 110 may provide the PIN to the individual so that the individual may then engage the entity.

One such implementation of multi-layer authentication based on the comparison of motion-based behavior data to previously captured motion-based behavior data is illustrated by process 800 in FIG. 8. Process 800 includes ten primary steps: prompt the individual with a security question 810, receive an answer to the security question 820, reject the identity authentication of the individual 830, display the defined pattern 840, receive a traced pattern 850, compare motion-based behavior data with previously captured motion-based behavior data 860, reject the identity authentication of the individual 870, authenticate the identity of the individual 880, transmit authentication confirmation 890, and receive a PIN, 895. Steps 810-895 are typically implemented in a computer, e.g., via software and/or hardware, e.g., motion-based authentication computing device 110 of FIG. 9.

In step 810, the individual may be prompted via user interface 140 with a security question when the individual requests to engage the entity. The security question may be a question in that the answer to the question is an object that may be displayed to the individual via user interface 140 when the individual correctly answers the security question. For example, the security question may be "Never ending journey?" so that the answer to the question may be infinity so that user interface 140 may display an ∞ pattern to the individual after the individual correctly answers the security question. In another example, the security question may be "My favorite fruit?" so that the answer to the question may be a pattern of an apple so that user interface 140 may display an apple pattern to the individual after the individual correctly answers the security question.

In an embodiment, the individual may initially select the answer to each security question by selecting the appropriate pattern that the individual requests to be the answer to the security question when the individual is initially signing up for the identity authentication required by the entity. For example, the individual is initially provided the security question of "My favorite fruit?" when the individual is enrolling as a customer of a bank. The individual may then select from different patterns depicting an apple, an orange, a banana, and/or any other pattern of a fruit that the individual requests to be displayed to them after the individual correctly answers the question. Each future identification authentication session engaged by the individual may display the pattern of the apple when the individual correctly answers the security question of "My favorite fruit?"

In an embodiment, the security question may be provided by identification server 215. Identification server 215 may be a server associated with the entity that is engaged to the identity authentications sessions. Identification server 215 may randomly select the security question from a plurality of security questions when the individual is initially signing up for the identity authentication required by the entity and associate that security question with the individual. The answer to the security question as selected by the individual may be provided to identification server 215 so that identification server 215 may store the answer to the security question with the security question associated with the individual. The pattern associated with the answer to the security question may also be provided to identification server 215 for storage by identification server 215. In an example embodiment, step 810 may be performed by prompting module 970 and transceiver 920 as shown in FIG. 9.

In step 820, an answer to the security question may be received. The individual may input the answer to the security question via user interface 140. The answer to the security question may then be determined as correct or incorrect. As noted above, the individual selected the answer to the security question when initially signing up for the identity authentication required by the entity. The answer received for the current authentication session may be compared to the answer initially selected when initially signing up for the identity authentication required by the entity. In an example embodiment, step 820 may be performed by transceiver 920 as shown in FIG. 9.

In step 830, the identity authentication may be rejected when an incorrect answer to the security question is received. Identification server 215 may be alerted of the rejected identity authentication. Identification server 215 may store characteristics of the rejected identity authentication session so that when the imposter attempts to engage future authentication sessions associated with the entity, identification server 215 may be able to identify the imposter as attempting fraudulently engage the entity. In an example embodiment step 830 may be performed by rejection module 950 and transceiver 920 as shown in FIG. 9.

In step 840, the pattern that is associated with the correct answer to the security question may be displayed to the individual via user interface 140 after the correct answer to the security question is received. As noted above, the individual may have selected a pattern that depicts the correct answer to the security question. For example, after the individual correctly answers the security question of "My favorite fruit?" with apple, user interface 140 displays a pattern of an apple to the individual. In an example embodiment, step 840 may be performed by user interface 140 as shown in FIG. 9.

In step 850, a trace completed by the individual of the pattern that depicts the correct answer to the security question may be received. The motion-based behavior data captured from the trace completed by the individual may be stored in motion-based behavior data database 190 that is associated with motion-based authentication computing device 110 rather than storing the motion-based behavior data in identification server 215. Storing motion-based behavior data in motion-based behavior data database 190 independent from identification server 215 prevents a hacker from obtaining the motion-based behavior data by hacking into identification server 215. Rather, a hacker would have to hack into motion-based authentication computing device 110 to obtain the motion-based behavior data. Even if the hacker were to obtain the motion-based behavior data, as noted in detail above, motion-based behavior data that is substantially similar to previously captured motion-based behavior would result in a rejection of the identity authentication of the hacker. In step 860, motion-based behavior data may be compared with previously captured motion-based behavior data.

In step 870, the identity authentication of the individual may be rejected when the motion-based behavior data captured from the traced pattern is outside a threshold from the previously captured motion-based behavior data. Identification server 215 associated with the entity may be alerted of the rejected identity authentication when the motion-based behavior data is not within the threshold of the previously captured motion-based behavior data. Identification server 215 may store the fraudulent motion-based behavior data captured from the imposter fraudulently attempting to engage the entity as the individual. Identification server 215 may then generate an alert each time the fraudulent motion-based behavior data is received to prevent the imposter from engaging the entity as the individual in future identity authentication sessions. In an example embodiment, step 870 may be performed by rejection module 950 and transceiver 920 as shown in FIG. 9.

In step 880, the identity of the individual may be authenticated when the motion-based behavior data captured from the traced pattern is within a threshold of the previously captured motion-based behavior data.

In step 890, authentication confirmation of the identity authentication of the individual may be transmitted to identification server 215. Authentication confirmation of the identity authentication of the individual may be transmitted to identification server 215 when the motion-based behavior data captured from the trace of the pattern by the individual is within a threshold of the previously captured motion-based behavior data. As noted in detail above, each time the individual completes the trace of the pattern, the motion-based behavior data may vary within the threshold of the previously captured motion-based behavior data. As a result, randomization is generated by the motion-based behavior data used to authenticate the individual because the motion-based behavior data may be different each time the individual traces the pattern. The randomization of the motion-based behavior data prevents an imposter from being able to fraudulently impersonate the individual. In an example embodiment, step 890 may be performed by transceiver 920 as shown in FIG. 9.

In step 895, a PIN may be received from identification server 215. After identification server 215 receives confirmation that the identity of the individual has been authenticated, identification server 215 may query personal identification number database 925 for a random PIN. Identification server 215 may then provide the randomly selected pin to be displayed to the individual by user interface 140. The individual may then enter the randomly selected PIN into the authentication session. At that point, the individual may be given access to engage the entity. The randomization of selecting the random PIN by identification server 215 provides an additional level of randomization to the process. Not only is the motion-based behavior data generated in a random fashion, the random PIN generated after confirmation that the motion-based behavior data is within the threshold of the previously captured motion-based behavior data is also random. Each time the individual successfully engages future authentication sessions, identification server 215 may provide a different random PIN for each authentication session providing additional randomness to the authentication process.

Further, the random PIN is stored in personal identification number database 925 that is independent from motion-based authentication computing device 110 so that the random PIN is stored in a location independent from where the motion-based behavior data is stored. As a result, a hacker would have to hack into identification server 215 to somehow obtain the randomly generated PIN and also into motion-based authentication computing device 110 to obtain the motion-based behavior data. The independent storage of the randomly generated PIN and the motion-based behavior data provides additional layers of security. As noted in detail above, even if the hacker were to obtain the motion-based behavior data and the random PIN, the hacker would still be prevented from fraudulently impersonating the individual if the motion-based behavior data is substantially similar to the previously generated motion-based behavior data.

The random PIN may include but is not limited to sound waves depicting the random PIN, a Bluetooth signal depicting the random PIN, a paraphrase depicting the random PIN, and/or any other type of random identification that may be provided to the individual via identification server 215 to complete the identity authentication that will be apparent to those skilled in the relevant art(s) without departing from the spirit and scope of the invention. In an example embodiment, step 895 may be performed by transceiver 920 as shown in FIG. 9.

Example Motion-Based Identity Authentication System

As shown in FIG. 9, motion-based identity authentication system 900 includes motion-based sensor server 150, network 120, motion-based sensor system 130, motion-based authentication computing device 110, user interface 140, motion-based behavior data database 190, identification server 915, and personal identification number database 925. Motion-based authentication computing device 110 includes a prompting module 970, a transceiver 920, a capturing module 940, a comparing module 980, an authentication module 930, a rejection module 950, and a storing module 960.

Modules as described above may be used by motion-based authentication computing device 110. Examples of functionality performed by each module are referenced in the above discussion. However, the above references are examples and are not limiting. The functionality of each module may be performed individually by each module and/or be shared among any combination of modules. As referred to herein, a module may be any type of processing (or computing) device having one or more processors. For example, a module can be an individual processor, workstation, mobile device, computer, cluster of computers, set-top box, game console or other device having at least one processor. In an embodiment, multiple modules may be implemented on the same processing device. Such a processing device may include software, firmware, hardware, or a combination thereof. Software may include one or more applications and an operating system. Hardware can include, but may not be limited to, a processor, memory, and/or graphical user display.

Embodiments can work with software, hardware, and/or operating system implementations other than those described herein. Any software, hardware, and operating system implementations suitable for performing the functions described herein can be used. Embodiments are applicable to both a client and to a server or a combination of both.

The breadth and scope of the present disclosure should not be limited by any of the above-described example embodiments, but should be defined only in accordance with the following claims and their equivalents.

What is claimed is:

1. A method for securely authenticating an identity of an individual based on a pattern that is traced by the individual, comprising:
   prompting the individual with a three-dimension authentication template that includes a defined three-dimension pattern for the individual to trace, the tracing of the defined pattern including a plurality of motions;
   receiving the traced pattern from the individual generated from tracing wherein the plurality of motions generates input motion-based behavior data including behaviometric data associated with behaviometric characteristics of the individual;
   obtaining previously captured motion-based behavior data associated with tracing of the defined three-dimension pattern by the individual as reference motion-based behavior data;
   determining an inter-relationship of the input motion-based behavior data and an inter-relationship of the reference motion-based behavior data including generating a matrix for the input motion-based behavior data set and a matrix for the reference motion-based behavior data set, the matrices each reflecting the impact of pieces of data in the set on other pieces of data in the same set;
   adjusting the input motion-based behavior data to account for the inter-relationship thereof using the matrices; and
   comparing the adjusted input motion-based behavior data with the previously captured motion-based behavior data while maintaining the inter-relationship of both the input and reference motion-based behavior data to thereby authenticate the identity of the individual.

2. The method of claim 1, wherein the previously captured motion-based behavior data is stored in a motion-based behavior data database that is associated with the individual.

3. The method of claim 1, further comprising:
   authenticating the identity of the individual when the motion-based behavior data is within a threshold of the previously captured motion-based behavior data.

4. The method of claim 3, further comprising:
   rejecting authentication of the identity of the individual when the motion-based behavior data is outside the threshold of the previously captured motion-based behavior data; and
   rejecting authentication of the identity of the individual when the motion-based behavior data is substantially identical to the previously captured motion-based behavior data.

5. The method of claim 3, wherein the previously captured motion-based behavior data includes motion-based behavior data that is associated with a previous authentication of the identity of the individual.

6. The method of claim 5, further comprising:
   storing the input motion-based behavior data in a motion-based behavior data database to be associated with the previous authentication of the identity of the individual when the input motion-based behavior data authenticates the identity of the individual.

7. The method of claim 1, wherein the input motion-based behavior data is associated with a height, a width, and a depth of the defined three-dimension pattern.

8. The method of claim 1, wherein the motion-based behavior data also includes biometric data that is associated with biometric characteristics of the individual generated when the individual executed the plurality of motions to trace the defined pattern.

9. The method of claim 8, wherein the biometric characteristics used to authenticate the identity of the individual are selected from the group consisting of a finger length ratio for each finger relative to each other respective finger and/or a phalanx to metacarpal ratio for each finger.

10. The method of claim 1, wherein the behaviometric characteristics used to authenticate the identity of the individual include a position and/or speed of a hand throughout the trace of the defined pattern and/or the position and/or the speed of each finger throughout the trace of the defined pattern.

11. The method of claim 10, wherein the position and/or the speed of the hand and the speed and/or the position of each finger is captured for each axes of motion.

12. The method of claim 1, wherein the behaviometric characteristics used to authenticate the identity of the individual are selected from the group consisting of: a sequence of dots included the defined pattern that are traced together by the individual, each limb included in a movement in completing the trace of the defined pattern, and/or an angular position and/or velocity of a wrist over time.

13. A system for securely authenticating an identity of an individual based on a pattern that is traced by the individual, comprising:
   one or more processors; and
   a memory including instructions that, when executed by the one or more processors, cause the system to:
   prompt the individual with a three-dimension authentication template that includes a defined three-dimension pattern for the individual to trace, the tracing of the defined pattern including a plurality of motions;

receive the traced pattern from the individual generated from tracing wherein the plurality of motions generates input motion-based behavior data including behaviometric data associated with behaviometric characteristics of the individual;

obtain previously captured motion-based behavior data associated with tracing of the defined three-dimension pattern by the individual as reference motion-based behavior data;

determine an inter-relationship of the input motion-based behavior data and an inter-relationship of the reference motion-based behavior data including generating a matrix for the input motion-based behavior data set and a matrix for the reference motion-based behavior data set, the matrices each reflecting the impact of pieces of data in the set on other pieces of data in the same set;

adjust the input motion-based behavior data to account for the inter-relationship thereof using the matrices; and compare the adjusted input motion-based behavior data with the previously captured motion-based behavior data while maintaining the inter-relationship of both the input and reference motion-based behavior data to thereby authenticate the identity of the individual.

14. The system of claim 13, wherein the previously captured motion-based behavior data is stored in a motion-based behavior data database that is associated with the individual.

15. The system of claim 14, wherein the previously captured motion-based behavior data is captured from a previously traced pattern previously traced by the individual.

16. The system of claim 13, wherein the instructions further cause the system to:
authenticate the identity of the individual when the motion-based behavior data is within a threshold of the previously captured motion-based behavior data.

17. The system of claim 16, wherein the instructions further cause the system to:
reject authentication of the identity of the individual when the motion-based behavior data is outside of the threshold of the previously captured motion-based behavior data; and reject authentication of the identity of the individual when the motion-based behavior data is substantially identical to the previously captured motion-based behavior data.

18. The system of claim 16, wherein the previously captured motion-based behavior data includes motion-based behavior data that is associated with a previous authentication of the identity of the individual.

19. The system of claim 18, wherein the instructions further cause the system to:
store the input motion-based behavior data in a motion-based behavior data database to be associated with the previous authentication of the identity of the individual when the input motion-based behavior data authenticates the identity of the individual.

20. The system of claim 13, wherein the input motion-based behavior data is associated with a height, a width, and a depth of the defined three-dimension pattern.

21. The system of claim 13, wherein the motion-based behavior data also includes biometric data that is associated with biometric characteristics of the individual generated when the individual executed the plurality of motions to trace the defined pattern.

22. The system of claim 21, wherein the biometric characteristics used to authenticate the identity of the individual are selected from the group consisting of a finger length ratio for each finger relative to each other respective finger and/or a phalanx to metacarpal ratio for each finger.

23. The system of claim 13, wherein the behaviometric characteristics used to authenticate the identity of the individual include a position and/or speed of a hand throughout the trace of the defined pattern and/or the position and/or the speed of each finger throughout the trace of the defined pattern.

24. The system of claim 23, wherein the position and/or the speed of the hand and the speed and/or the position of each finger is captured for each axis of motion and/or combined across a plurality of axes of motion.

25. The system of claim 13, wherein the behaviometric characteristics used to authenticate the identity of the individual are selected from the group consisting of: a sequence of dots included the defined pattern that are traced together by the individual, each limb included in a movement in completing the trace of the defined pattern, and/or an angular position and/or velocity of a wrist over time.

* * * * *